(12) United States Patent
Kobayashi

(10) Patent No.: US 7,313,062 B2
(45) Date of Patent: Dec. 25, 2007

(54) DISC RECORDING MEDIUM, RECORDING METHOD, DISC DRIVE DEVICE

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 286 days.

(21) Appl. No.: 10/486,282

(22) PCT Filed: Jun. 4, 2003

(86) PCT No.: PCT/JP03/07077

§ 371 (c)(1),
(2), (4) Date: Feb. 9, 2004

(87) PCT Pub. No.: WO03/105150

PCT Pub. Date: Dec. 18, 2003

(65) Prior Publication Data

US 2005/0083740 A1 Apr. 21, 2005

(30) Foreign Application Priority Data

Jun. 11, 2002 (JP) ............................. 2002-170266

(51) Int. Cl.
*G11B 7/00* (2006.01)
(52) U.S. Cl. .................... 369/47.1; 369/47.14
(58) Field of Classification Search ............... 369/47.1
See application file for complete search history.

(56) References Cited

U.S. PATENT DOCUMENTS 6,243,338 B1 * 6/2001 Mine ........................ 369/47.1

2004/0156294 A1 * 8/2004 Watanabe et al. ............ 369/94
2006/0077827 A1 * 4/2006 Takahashi ................ 369/47.14

FOREIGN PATENT DOCUMENTS

| JP | 59-65910 | 4/1984 |
|---|---|---|
| JP | 1-159870 | 6/1989 |
| JP | 9-213011 | 8/1997 |

* cited by examiner

Primary Examiner—Wayne Young
Assistant Examiner—Van T. Pham
(74) Attorney, Agent, or Firm—Oblon, Spivak, McClelland, Maier & Neustadt, P.C.

(57) ABSTRACT

It is an object of the present invention to improve reliability of defect management. By providing a plurality of management data areas each including a defect management area typically in a lead-in zone of a disc inner-side region enclosed by a circumference having a predetermined radius on a disc-shaped recording medium, reliability of the defect management can be obtained. In addition, by placing a plurality of the defect management areas (information areas Info1 and Info2) at locations, which are separated from each other in the radial direction of the disc-shaped recording medium, sandwiching a recording/reproduction condition adjustment area OPC having a relatively large size, the reliability of the defect management areas can be further improved. Furthermore, by providing each of the defect management areas with a plurality of recording areas, which include a currently used recording area for recording defect management information and spare recording areas each usable as a substitute for the currently used recording area, the currently used recording area can be replaced with one of the spare recording areas in accordance with an update count of the currently used recording area or error status of this currently used recording area.

6 Claims, 18 Drawing Sheets

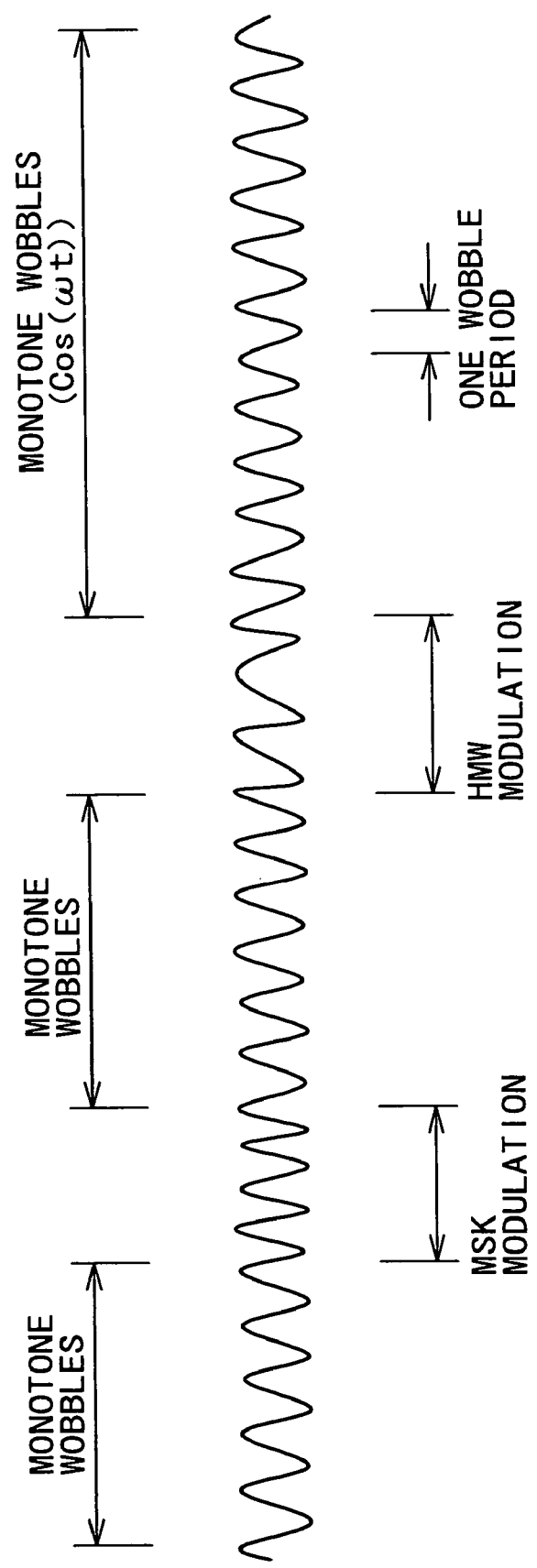

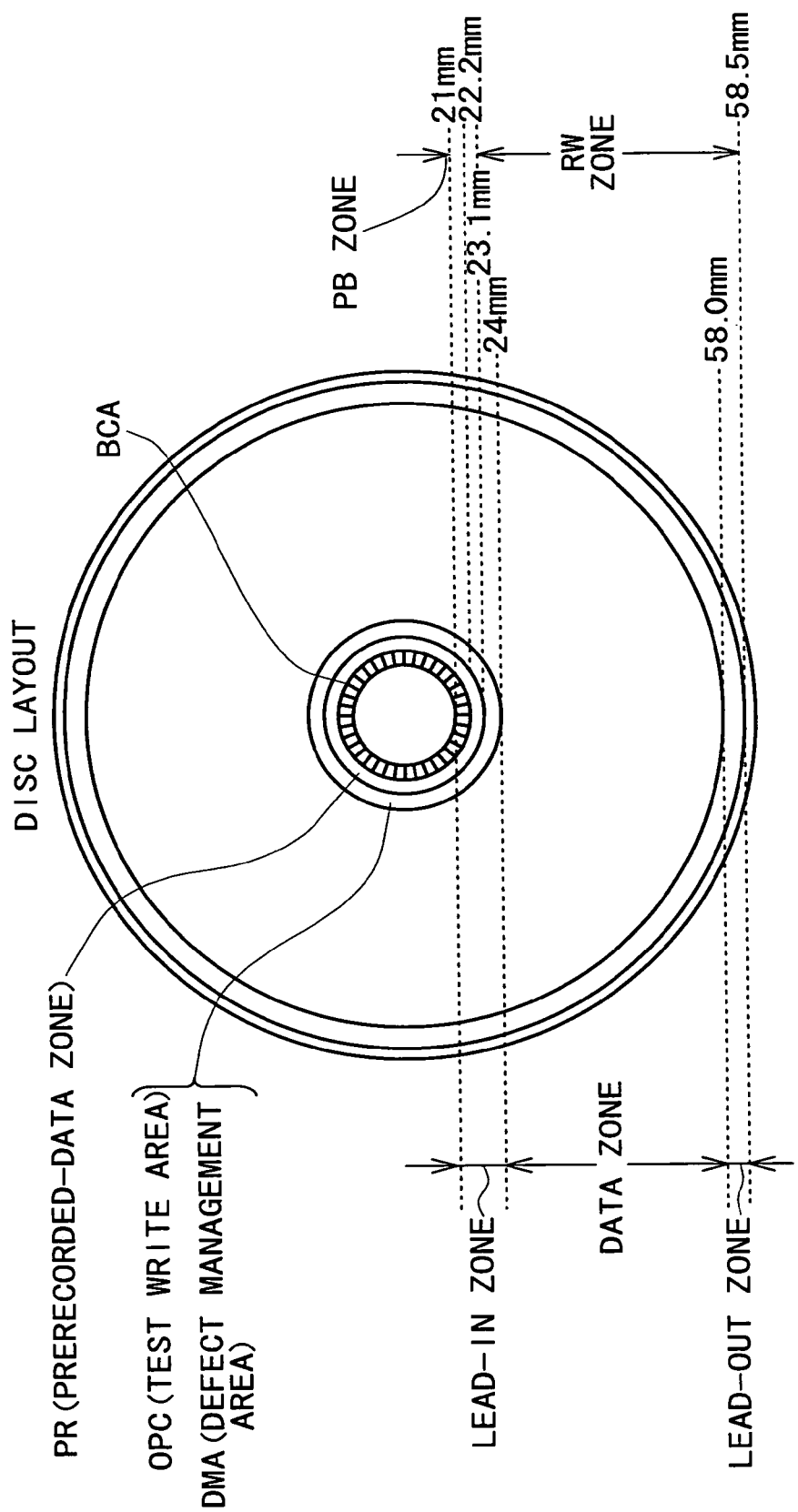

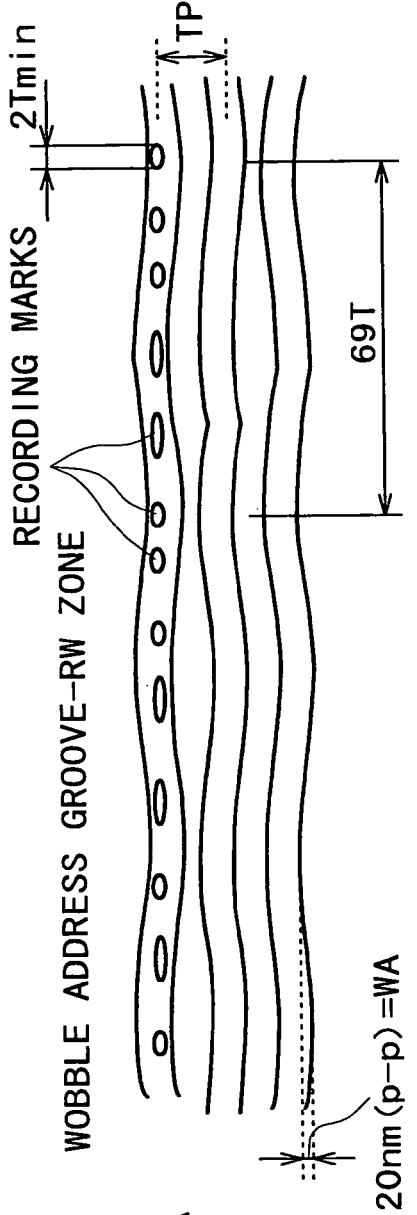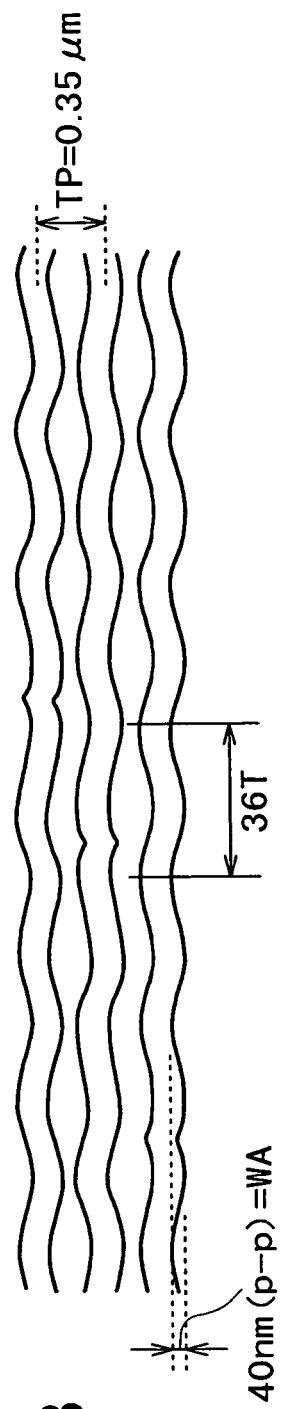
FIG. 5A
FIG. 5B

FIG. 6
FM CODES
MODULATION RULES
| | | "1" | "0" |
|---|---|---|---|
| (a) | DATA BITS | | |
| (b) | CHANNEL CLOCKS |  |  |
| (c) | FM CODES |  |  |
| (d) | WOBBLES | | |
| (e) | FM CODES |  |  |
| (f) | WOBBLES |  |  |
| (g) | DATA-BIT STREAM | 1 0 1 1 0 0 1 0 | |
| (h) | FM-CODES STREAM |  | |
| (i) | WOBBLE STREAM |  | |
| (j) | FM-CODES STREAM |  | |
| (k) | WOBBLE STREAM |  | |
(c),(d) or (e),(f)
(h),(i) or (j),(k)

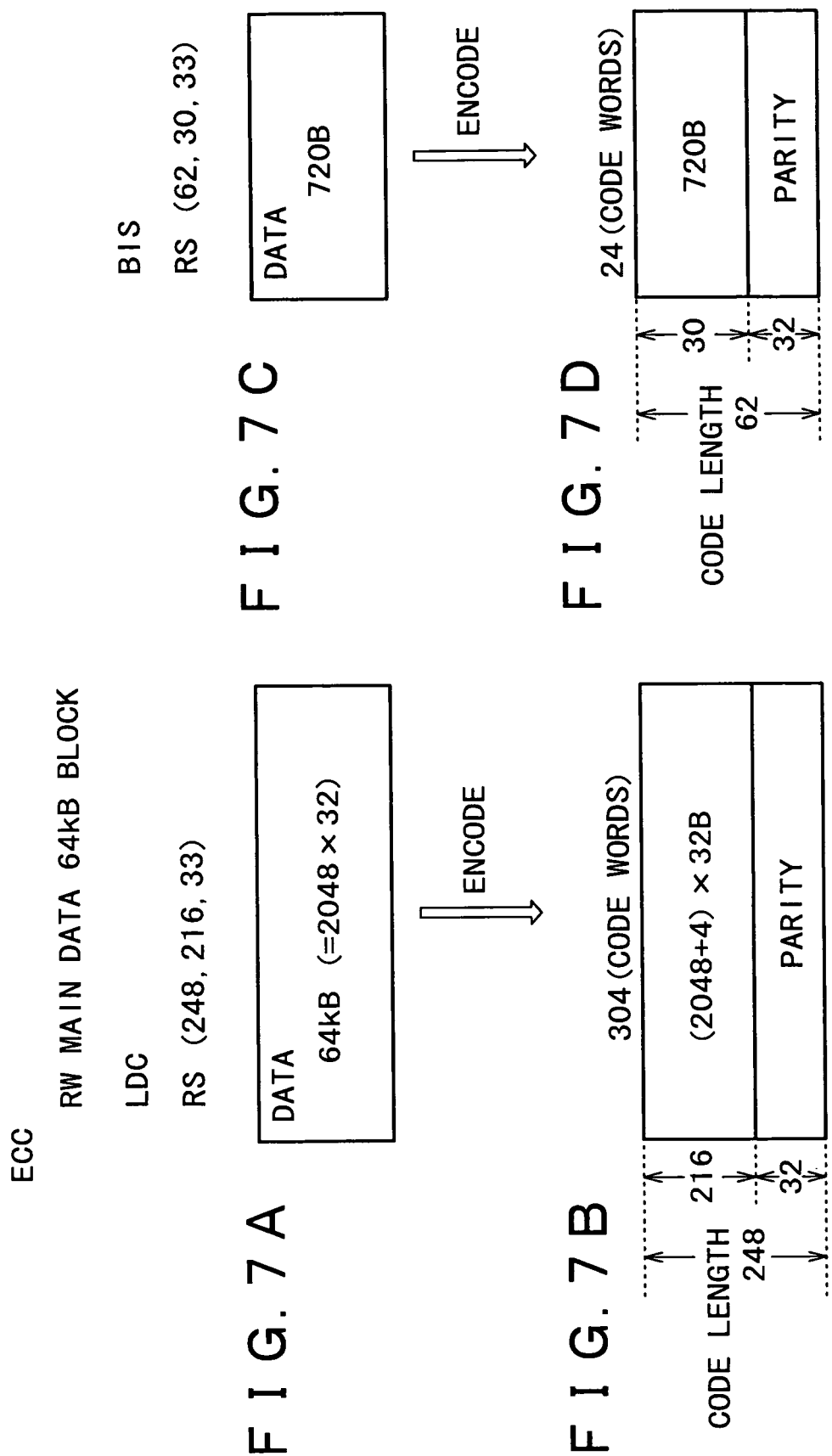

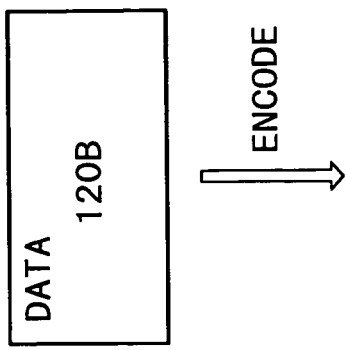
F I G. 8C
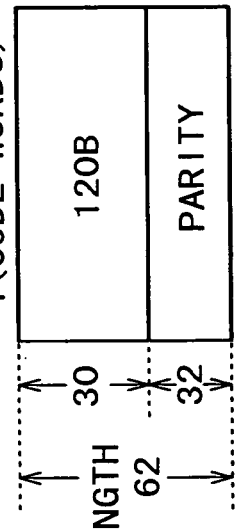
F I G. 8D
ECC
PRERECORDED DATA 4kB BLOCK
LDC
RS (248, 216, 33)
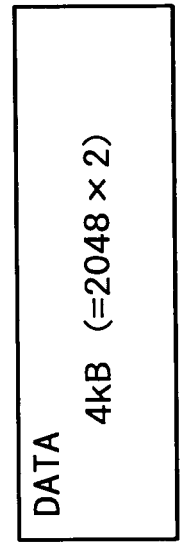
F I G. 8A
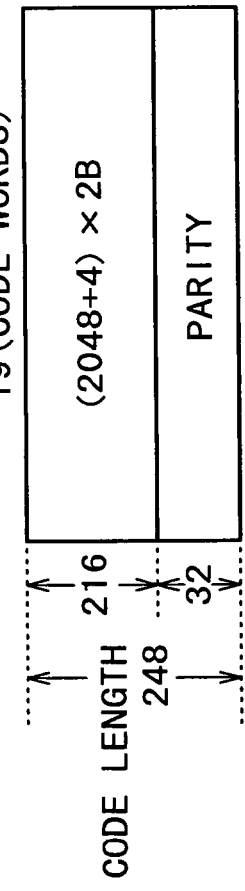
F I G. 8B

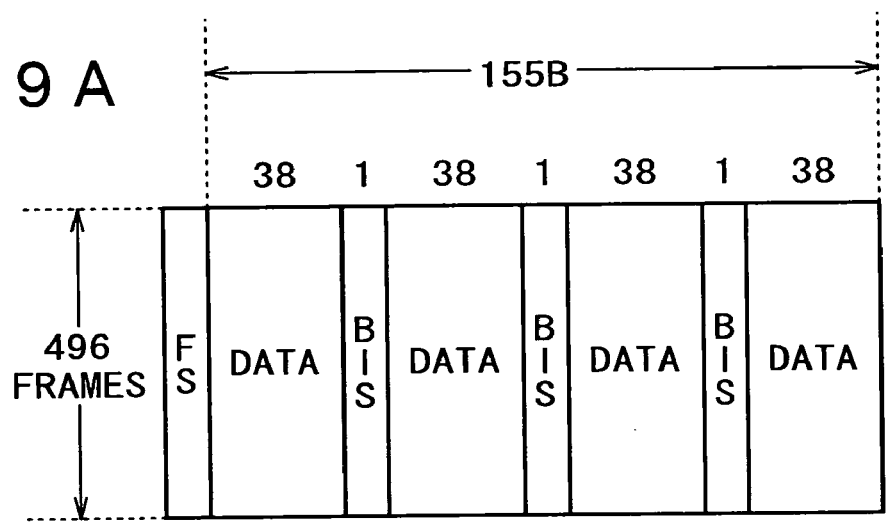
FIG. 9A  RW MAIN DATA FRAME STRUCTURE
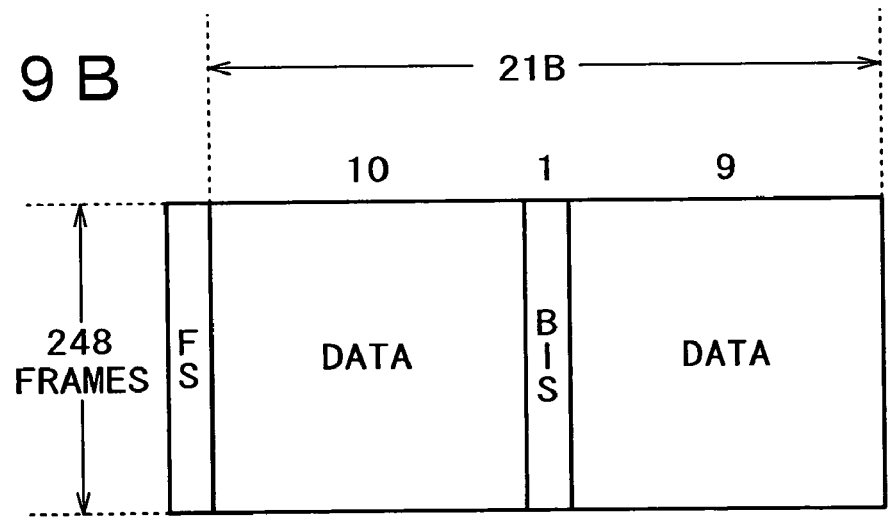
FIG. 9B  PRERECORDED DATA FRAME STRUCTURE

FIG. 11B

Info 2

| | NUMBER OF CLUSTERS |
|---|---|
| RESERVED | 160 |
| DMA 2 | 32 |
| CONTROL DATA AREA (CDA 2) | 32 |
| BUFFER | 32 |

FIG. 11A

Info 1

| | NUMBER OF CLUSTERS |
|---|---|
| BUFFER | 32 |
| DRIVE AREA | 32 |
| RESERVED | 96 |
| DMA 1 | 32 |
| CONTROL DATA AREA (CDA 1) | 32 |
| BUFFER | 32 |

FIG. 12

DMA LAYOUT

| CLUSTER NUMBERS | DATA DESCRIPTION | NUMBER OF CLUSTERS |
|---|---|---|
| 1-4 | DDS (REPEATED FOUR TIMES) | 4 |
| 5-8 | DL FIRST POSITION | 4 |
| 9-12 | DL SECOND POSITION | 4 |
| ... | ... | ... |
| 29-32 | DL SEVENTH POSITION | 4 |

FIG. 13

DDS

| DATA FRAME | BYTE POSITION | DATA DESCRIPTION | BYTE COUNT |
|---|---|---|---|
| 0 | 0 | DDS IDENTIFIER="DS" | 2 |
| | 2 | DDS FORMAT=00h | 1 |
| | 3 | RESERVED AND SET TO 00h | 1 |
| | 4 | DDS UPDATE COUNT | 4 |
| | 8 | RESERVED AND SET TO 00h | 8 |
| | 16 | FIRST PSN OF DRIVE AREA | 4 |
| | 20 | RESERVED AND SET TO 00h | 4 |
| | 24 | FIRST PSN ON DEFECT LIST | 4 |
| | 28 | RESERVED AND SET TO 00h | 4 |
| | 32 | POSITION OF LSN 0 IN USER DATA AREA | 4 |
| | 36 | FIRST LSN IN USER DATA AREA | 4 |
| | 40 | ISA SIZE | 4 |
| | 44 | OSA SIZE | 4 |
| | 48 | RESERVED AND SET TO 00h | 4 |
| | 52 | SPARE AREA FULL FLAG | 1 |
| | 53 | RESERVED AND SET TO 00h | 1 |
| | 54 | DISC CERTIFICATION FLAG | 1 |
| | 55 | RESERVED AND SET TO 00h | 1 |
| | 56 | LAST VERIFIED ADDRESS POINTER | 4 |
| | 60 | RESERVED AND SET TO 00h | 1988 |
| 1 | 0 | RESERVED AND SET TO 00h | 2048 |
| ⋮ | ⋮ | ⋮ | ⋮ |
| 31 | 0 | RESERVED AND SET TO 00h | 2048 |

FIG. 14

DL (DEFECT LIST)

| CLUSTER NUMBER/ DATA FRAME | BYTE POSITION | DATA DESCRIPTION | BYTE COUNT |
|---|---|---|---|
| 0/0 | 0 | DEFECT LIST HEADER | 64 |
| 0/0 ... 0/31 | 64 | DEFECT LIST | 65472 |
| 1/0 ... 1/31 | 0 | DEFECT LIST | 65536 |
| 2/0 ... 2/31 | 0 | DEFECT LIST | 65536 |
| 3/0 ... | 0 | DEFECT LIST | $n \times 8$ |
| ... | $n \times 8$ | DEFECT LIST TERMINATOR | 8 |
| 3/31 | $(n+1) \times 8$ | RESERVED AND SET TO 00h | ... |

DISC RECORDING MEDIUM, RECORDING METHOD, DISC DRIVE DEVICE

TECHNICAL FIELD

The present invention relates to a disc-shaped recording medium such as an optical disc, a recording method adopted for the disc-shaped recording medium, and a disc drive apparatus for driving the disc-shaped recording medium.

BACKGROUND ART

As a technology for recording and reproducing digital data onto and from recording media, there has been provided a data-recording technology to be applied to optical discs used as the recording media. The optical discs to which the data-recording technology is applied include magneto optical discs. Examples of the optical disc are a CD (Compact Disc), an MD (Mini-Disc), and a DVD (Digital Versatile Disc). An optical disc is a generic name of recording media to which a laser beam is radiated to get reflected light in order to read out a signal representing changes in reflected beam. The optical disc is a disc-shaped recording medium made of a metallic thin plate protected by a plastic enclosure.

Optical discs are classified into two categories, namely, a reproduction-only type and a recordable type, which allows user data to be recorded on the disc. Examples of the optical disc pertaining to the reproduction-only category include a CD, a CD-ROM, and a DVD-ROM, which are already known. On the other hand, examples of the optical disc pertaining to the recordable category include those known as an MD, a CD-R, a CD-RW, a DVD-R, a DVD-RW, a DVD+RW, and a DVD-RAM. User data can be recorded onto an optical disc pertaining to the recordable category by adoption of recording techniques such as a magneto-optical recording method, a phase-change recording method, and a pigment-film-change recording method. The pigment-film-change recording method is also referred to as a write-once recording method, which allows data to be recorded only once and allows no overwriting of new data on already recorded data. The pigment-film-change recording method is suitable for an application to preserve data and the like. On the other hand, the magneto-optical recording method and the phase-change recording method allow new data to be written over already recorded data and are thus adopted in a variety of applications to record a variety of contents such as musical data, video data, game software, and application programs.

In addition, a high-density optical disc known as a DVR (Data & Video Recording) has been developed in recent years to drastically increase the storage capacity.

In order to record data onto an optical disc pertaining to the recordable category by adoption of recording techniques such as the magneto-optical recording method, the phase-change recording method, and the pigment-film-change recording method, it is necessary to provide a guiding means for carrying out tracking along a data track on the disc. For this reason, a groove is formed on the optical disc as a pre-groove. A groove or a land is then used as the data track. A land is a member resulting on the optical disc as an area sandwiched by two adjacent grooves. A land has a cross section with a shape resembling a plateau.

In addition, in order to be able to record data at any desired location on a data track, the address of each location on the data track needs to be embedded in the track. Such addresses are typically embedded in the data track by wobbling the groove serving as the track.

That is to say, a track used for storing data is formed in advance on the disc as a pre-groove with its side walls having wobbled faces to represent addresses.

By forming such a groove on the disc in advance, an address can be fetched from wobbling information conveyed by a reflected beam so that, even the address is not recorded on the track as pit data or the like, for example, data can be recorded and reproduced at a desired location on the track.

Thus, by adding address information embedded in a wobbling groove as described above, for example, it is no longer necessary to provide discrete address areas on the track as areas for recording address information as pit data so that the capacity of recording actual data can be increased by the sizes of the address areas, which become available for storing actual data.

It is to be noted that absolute time (address) information expressed by such a wobbling shape of a groove is referred to as an ATIP (Absolute Time In Pregroove) or an ADIP (Address In Pregroove).

By the way, management of defects on the optical disc is executed. This management is referred to simply as defect management.

The defect management is management for cataloging the address of each defect area. If spare recording areas are provided on the optical disc to each serve as a substitute for a defect area, the defect management is also management for managing addresses of the spare recording areas. A defect area is an area that data can no longer be recorded onto and reproduced from due to an injury or an other defect existing therein. The defect management is an important technique for preventing a failure from occurring in the system due to such an injury or a defect.

In the defect management, addresses of defect areas that data can no longer be recorded onto and reproduced from and addresses of spare recording areas are cataloged on a defect list. Thus, the defect list is a list used for cataloging information of importance to the defect management.

A high-density disc such as a DVR developed in recent years has a cover layer (a substrate) having a thickness of 0.1 mm in the dick thickness direction in its physical structure. In such a structure, phase-change marks are recorded and reproduced under a condition set by combining the so-called blue laser and an objective lens with an NA of 0.85. The blue laser is a laser beam having a wavelength of 405 nm. An optical disc with a diameter of 12 cm allows data of the amount of about 23.3 GB (gigabytes) to be recorded onto and reproduced from the disc provided that the data is recorded as phase-change marks on tracks with a track pitch of 0.32 microns and a line density of 0.12 microns/bit, a 64 KB data block is used as a recording/reproduction unit, and the disc has been formatted at a format efficiency of 82%.

A data zone on the optical disc is an area in which user data is recorded in and reproduced from. As a result of a formatting process of the optical disc, an area having a radius of 24 mm and a circumference having a radius of 58 mm becomes available as the data zone. An inner-side area enclosed by the circumference having a radius of 24 mm on the optical disc serves as a lead-in zone.

Used for storing defect management information, a defect management area is formed at a predetermined location in the lead-in zone. Two defect management areas may be provided. In this case, the two defect management areas are formed at predetermined adjacent locations in the lead-in zone.

A plurality of management areas such as, typically, two defect management areas, need to be formed because, if defect management information can no longer be read out from one of the two defect management areas for some reasons, the defect management information can still be read out from the other defect management area. With the two defect management areas formed at adjacent locations in the lead-in zone, however, it is quite within the bounds of possibility that defect management information can no longer be recorded and reproduced into and from both the two defect management areas when an injury is inflicted on the disc portion allocated to the two defect management areas. That is to say, the reliability of the defect management is not sufficient.

At a typical rotational speed of the optical disc, about 1.9 data blocks each having a size of 64 KB can be recorded onto a track on the circumference having a radius of 24 mm in one rotation of the optical disc.

The data zone used for recording user data has a large recording capacity of 23.3 GB. 18432 clusters in the data zone can be allocated as spare recording areas. Since such clusters have a size of about 1.207959552 GB, their size is only about 5% of the data zone used for recording user data. A defect list with a size of 8 bytes per entry will have a length of 147.456 KB and will occupy 3 clusters.

As described above, a defect management area including a defect list stored therein is formed as an area consisting of a plurality of clusters as described above. In this case, since about 1.9 data blocks each having a size of 64 KB can be recorded onto a track on the circumference having a radius of 24 mm in one rotation of the optical disc, with the two defect management areas formed at adjacent locations in the lead-in zone, it is quite within the bounds of possibility that defect management information can no longer be recorded and reproduced correctly into and from both the two defect management areas when an injury is inflicted on the disc portion allocated to the two defect management areas as explained above.

DISCLOSURE OF INVENTION

It is thus an object of the present invention addressing the problems described above to improve the reliability of defect management executed on a disc-shaped recording medium.

In order to achieve the object described above, a recording/reproduction condition adjustment area and a plurality of management data areas each including a defect management area are formed in a disc inner-side region enclosed by a circumference having a predetermined radius on a disc-shaped recording medium provided by the present invention by placing the management data areas at locations, which are separated from each other in the radial direction of the disc-shaped recording medium, sandwiching at least the recording/reproduction condition adjustment area.

In addition, the defect management area has a plurality of recording areas, which include spare recording areas, for recording defect management information.

In accordance with a recording method provided by the present invention, by carrying out a recording operation on a disc-shaped recording medium, in a process to form a recording/reproduction condition adjustment area and a plurality of management data areas each including a defect management area in a disc inner-side region enclosed by a circumference having a predetermined radius on the disc-shaped recording medium, the management data areas are placed at locations, which are separated from each other in the radial direction of the disc-shaped recording medium, sandwiching at least the recording/reproduction condition adjustment area.

In addition, the defect management area has a plurality of recording areas, which include spare recording areas, for recording defect management information.

Furthermore, in accordance with a recording method provided by the present invention, in an operation to record defect management information onto the disc-shaped recording medium, a determination an update count of the currently used recording area or error status of this currently used recording area is formed to give a determination to serve as a basis for determining whether or not the defect management information should be recorded in one of the spare recording areas, which is other than the currently used recording area and, if the defect management information is recorded in the other spare recording area, the other spare recording area is set as a recording area replacing the currently used recording area.

A disc drive apparatus provided by the present invention as a disc drive apparatus for recording and reproducing information onto and from the disc-shaped recording medium provided by the invention includes recording means for recording the information onto the disc-shaped recording medium and control means for determining an update count of the currently used recording area or error status of this currently used recording area in an operation to record defect management information onto the disc-shaped recording medium to give a determination to serve as a basis for determining whether or not the defect management information should be recorded in one of the spare recording areas, which is other than the currently used recording area; and recording information for setting the other spare recording area as a recording area replacing the currently used recording area in case the defect management information is recorded in the other spare recording area by the recording means.

That is to say, by providing a plurality of management data areas each including a defect management area in a disc inner-side region enclosed by a circumference having a predetermined radius on a disc-shaped recording medium in accordance with the present invention, reliability of the defect management can be obtained. In addition, by placing the defect management areas (thus, the management data areas) at locations, which are separated from each other in the radial direction of the disc-shaped recording medium, sandwiching a recording/reproduction condition adjustment area having a relatively large size, the reliability of the defect management areas can be further improved.

Furthermore, by providing each of the defect management areas with a plurality of recording areas, which include spare recording areas, for recording defect management information, the recording area can be changed in accordance with an update count of the defect management area or error status of this defect management area.

BRIEF DESCRIPTION OF DRAWINGS

FIG. 3 is an explanatory diagram showing a wobble signal obtained as a result of MSK and HMW modulations according to the embodiment;

FIG. 4 is an explanatory diagram showing a disc layout implemented by the embodiment;

FIG. 5A is an explanatory diagram showing a state of wobbling in an RW zone implemented by the embodiment;

FIG. 5B is an explanatory diagram showing a state of wobbling in a PB zone implemented by the embodiment;

FIG. 6 is an explanatory diagram showing a modulation method provided for prerecorded information in accordance with the embodiment;

FIGS. 7A, 7B, 7C, and 7D are diagrams showing ECC structures of phase-change marks used in the embodiment;

FIGS. 8A, 8B, 8C, and 8D are diagrams showing ECC structures of prerecorded information used in the embodiment;

FIG. 9A is an explanatory diagram showing a frame structure of information recorded as phase-change marks in accordance with the embodiment;

FIG. 9B is an explanatory diagram showing a frame structure of prerecorded information according to the embodiment;

FIGS. 11A and 11B are explanatory diagrams each showing an information area according to the embodiment;

FIG. 12 is an explanatory diagram showing the data structure of a DMA according to the embodiment;

FIG. 13 is an explanatory diagram showing the data structure of a DDS of the DMA according to the embodiment;

FIG. 14 is an explanatory diagram showing a defect list stored in the DMA according to the embodiment;

BEST MODE FOR CARRYING OUT THE INVENTION

The following description explains an optical disc implemented by an embodiment of the present invention, a disc drive apparatus (a recording/reproduction apparatus) for recording and reproducing data onto and from the optical disc as well as a method of recording data into a defect management area on the optical disc. The description is divided into paragraphs arranged in the following order.

1: Disc Structure
2: ECC Format of Data
3: Defect Management Area
3-1: Information Area Including a DMA
3-2: DMA Structure Having Spare Areas
3-3: Spare Areas of Data Zone
4: Disc Drive Apparatus 1: Disc Structure First of all, an optical disc implemented by an embodiment is explained. This optical disc can be implemented as a high-density optical disc known as the so-called DVR (Data & Video Recording).

Figure 1:
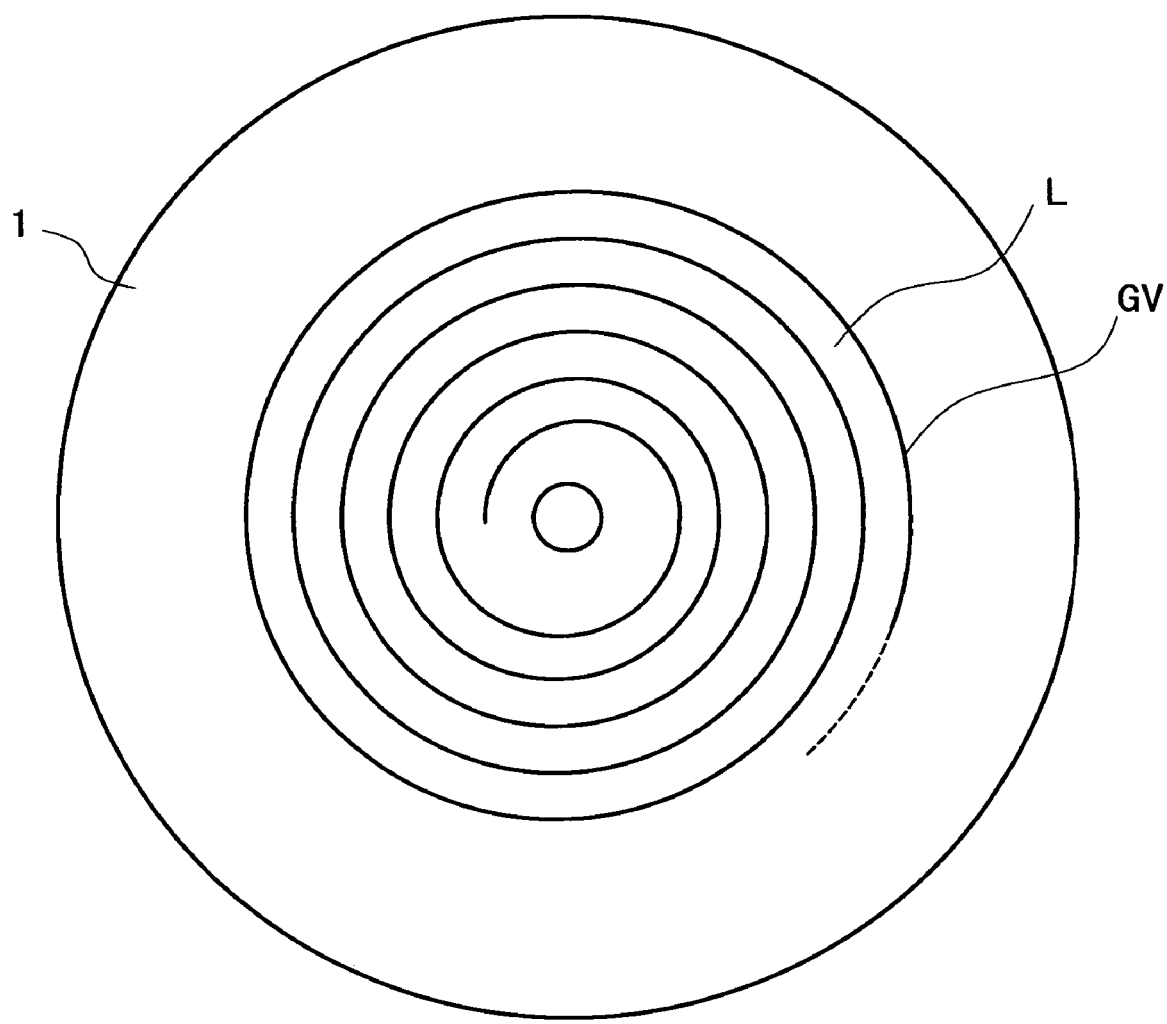
FIG. 1 is an explanatory diagram showing a groove formed on a disc implemented by an embodiment of the present invention.
Figure 2:
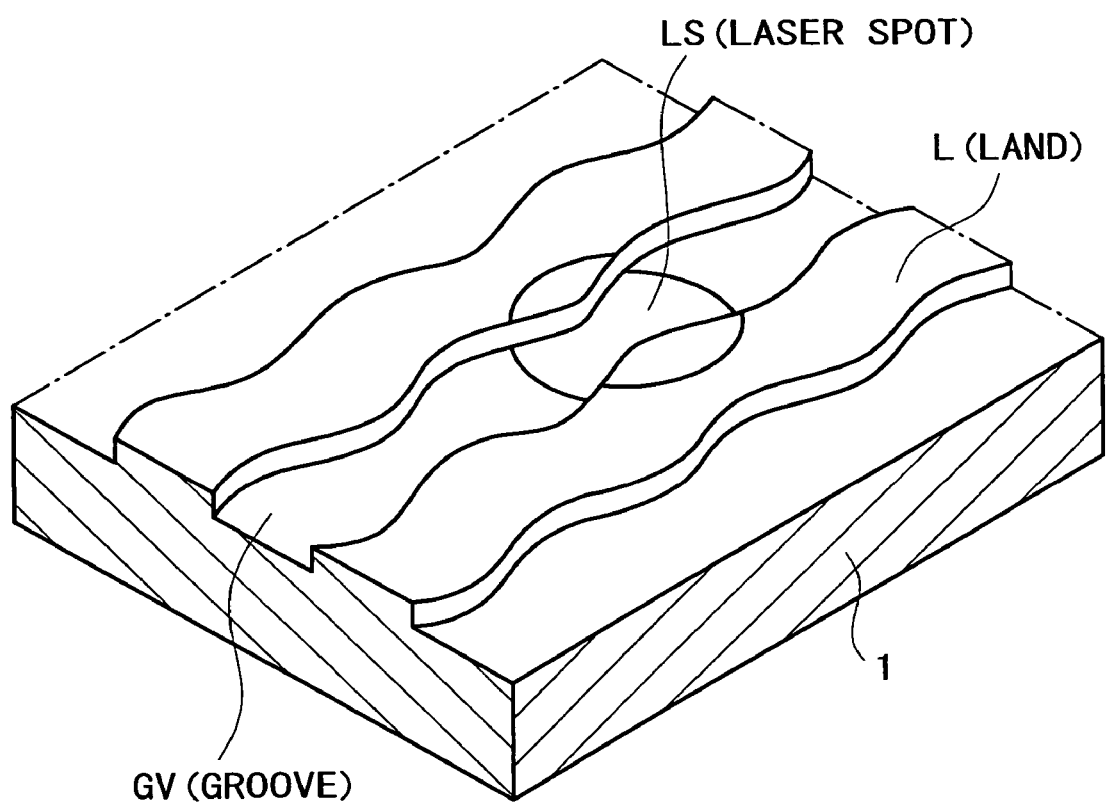
FIG. 2 is an explanatory diagram showing the wobbling shape of the groove formed on the disc implemented by the embodiment.

As shown in FIG. 1, an optical disc 1 implemented by an embodiment of the present invention forms a groove GV formed thereon to serve as a recording track. The groove GV is formed in the form of a spiral extended from the innermost-circumference side to the outermost-circumference side. FIG. 2 is a diagram showing a cross section in the radial direction of the optical disc 1. As shown in the figure, the cross section has lands L each having a protruding shape and grooves GV each having a denting shape. The lands L and the grooves GV are laid out alternately.

As shown in FIG. 2, the groove GV of the optical disc 1 has a wobbling shape with respect to a tangential line. The wobbling shape of the groove GV is a shape formed in accordance with a wobble signal. Thus, an optical-disc drive is capable of reproducing the wobble signal, in accordance with which the wobbling shape of the groove GV has been formed. To put it in detail, the optical-disc drive detects the positions of both edges of the groove GV from a laser beam reflected by a laser spot LS existing on the groove GV as a spot to which an original laser beam is radiated. When the laser spot LS is moved along the groove GV serving as a recording track, the detected positions vary, generating variations in positions. Then, the optical-disc drive extracts the variations in the radial direction of the optical disc 1, reproducing the wobble signal.

The wobble signal is a result of a modulation process carried out to include information on addresses of recording locations on the recording track in the wobble signal. The information includes addresses of recording locations and other additional data. Thus, by demodulating the wobble signal to extract the information on addresses, the optical-disc drive is capable of executing control of the addresses, which are accessed in operations to record and/or reproduce data onto and from the optical disc 1.

As described above, the embodiment of the present invention uses an optical disc 1 for storing such information by carrying out a groove-recording process. It is to be noted, however, that the scope of the present invention is not limited to the optical disc 1 adopting the groove-recording technique. For example, the present invention can also be applied to an optical disc for storing data onto a land by carrying out a land-recording operation. In addition, the present invention can also be applied to an optical disc for storing data onto a groove and a land by carrying out a groove/land-recording operation.

For the optical disc 1 implemented by the embodiment, two modulation methods are adopted in a modulation process carried out to generate a wobble signal conveying information on addresses in the wobble signal. One of the methods is an MSK (Minimum Shift Keying) modulation method. The other modulation method is a technique in accordance with which a higher harmonic wave signal of an even-numbered order is added to a sinusoidal carrier signal and the polarity of the higher harmonic wave signal is changed in dependence on the code of the modulation data. In the following description, the technical term 'an HMW (HarMonic Wave) modulation method' is used to imply the technique in accordance with which a higher harmonic wave signal of an even-numbered order is added to a sinusoidal carrier signal and the polarity of the higher harmonic wave signal is changed in dependence on the code of the modulation data as described above.

The optical disc 1 implemented by this embodiment is subjected to a reproduction operation carried out to generate a wobble signal having a block including an MSK-modulated portion and an HMW-modulated portion as shown in FIG. 3. The wobble signal is a result of a process carried out to modulate a sinusoidal reference carrier signal having a predetermined frequency. The waveform of the carrier signal has a period corresponding to the frequency. The block forms a predetermined number of successive periods of the waveform. The MSK-modulated portion conveys information on an address used as the MSK-modulation code and the HMW-modulated portion conveys information on an address used as the HMW-modulation code. That is to say, in the block, the information on an address used as the MSK-modulation code is inserted into a position different from the position of the information on an address used as the HMW-modulation code. In addition, one of two sinusoidal carrier signals used in the MSK modulation and the carrier signal used in the HMW modulation are used as the reference carrier signal cited above. Furthermore, in the block, the MSK-modulated and HMW-modulated portions are placed at positions separated away from each other by at least one period of the reference carrier signal.

It is to be noted that monotone wobbles shown in the figure form a portion with a length equal to several periods of the reference carrier signal, which are not subjected to a modulation process according to modulation data. A period of the reference carrier signal is referred to as a wobble period. In addition, the frequency of the reference carrier signal is fixed throughout the entire storage area from the innermost circumference to the outermost circumference. The constant value of the frequency is determined from the linear velocity of the laser spot moving along the recording track.

The following description explains typical physical parameters of a high-density optical disc provided by this embodiment as an optical disc referred to as the so-called DVR (Data & Video Recording).

The optical disc, known as the DVR disc implemented by this embodiment, is an optical disc onto which data is recorded by adoption of a phase-change method. As a disc size, the DVR disc has a diameter of 120 mm. In addition, the DVR disc has a thickness of 1.2 mm with a cover-layer thickness of 0.1 mm. Thus, from the disc-size point of view, the appearance of the DVR disc is similar to a disc adopting the CD (Compact Disc) method or a disc adopting the DVD (Digital Versatile Disc).

A laser known as a so-called blue laser is used in carrying out recording and reproduction operations. The blue laser has a wavelength of 405 nm. The NA of the optical system is set at 0.85.

A track pitch between tracks on which phase-change marks are recorded is set at 0.32 microns. The tracks have a line recording density of 0.12 microns per bit. A 64-KB data block is used as a recording/reproduction unit. The format efficiency of the DVR disc is about 82%. This DVR disc with a diameter of 12 cm realizes a data storage capacity of 23.3 gigabytes. As described above, data is recorded onto the DVR disc by adoption of the groove recording method.

FIG. 4 is a diagram showing the layout (or the area configuration) of the entire disc.

The area on the surface of the disc includes a lead-in zone, a data zone, and a lead-out zone, which are laid out in a direction from the inner circumferential side to the outer circumferential side.

From the recording/reproduction point of view, the surface of the disc includes a reproduction-only area known as a PB zone and a recording/reproduction area referred to as an RW zone. The PB zone is located on the inner circumferences of the lead-in zone and the RW zone is an area stretched from the outermost circumference of the lead-in zone to the lead-out zone.

The lead-in zone is a circular area enclosed by a circumference having a radius of 24 mm. A ring-like area having a radius of 21 mm to 22.2 mm is referred to as a BCA (Burst Cutting Area). The BCA is an area used for recording a unique ID peculiar to the disc-shaped recording medium by adoption of a recording method of engraving marks on a recording layer by carrying out a burning process. To put it in detail, recorded marks each having circular shape are formed and laid out concentrically with each other to form recorded data resembling bar codes. A ring-like area having a radius of 22.2 mm to 23.1 mm is referred to as a prerecorded-data zone.

The prerecorded-data zone is a zone for recording data in advance by wobbling a spiral-like groove formed on the disc. The data includes information on the disc and prerecorded information. An example of the information on the disc is recording and reproduction power conditions whereas an example of the prerecorded information is information used for copy protection.

The unique ID, the information on the disc, and the prerecorded information are reproduction-only information. That is to say, the BCA and the prerecorded-data zone are the aforementioned PB zone (or the reproduction-only area).

As described above, the prerecorded information includes the copy-protection information, which is used for carrying out protections as follows.

With the optical-disc system implemented by this embodiment, registered disc-drive manufacturers or registered disc manufacturers are each provided with a media key or a drive key, which can be used in doing businesses. The media or drive key assigned to a manufacturer is a key for indicating that the manufacturer has been registered.

In order to avoid hacker problems, the media or drive key is recorded on the disc as the information used for copy protection. A disc-shaped recording medium including a media or drive key or a disc drive apparatus is capable of making recording and reproduction operations impossible.

The outermost ring in the lead-in zone, that is, the ring having a radius of 23.1 mm to 24.0 mm, is used as information areas Info1 and Info2 in addition to a test write area OPC.

The test write area OPC is used in a write operation carried out on a trial basis in order to set conditions for recording and reproduction of phase-change marks. Examples of the recording and reproduction conditions are powers of laser beams used in recording and reproduction operations. That is to say, the test write area OPC is an area used for adjustment of the recording and reproduction conditions.

The information areas Info1 and Info2 include a defect management area (DMA). The defect management area DMA records and reproduces information for managing defect information on the disc.

The outermost ring having a radius of 23.1 mm to 24.0 mm to serve as an RW-zone portion in the lead-in zone, is an area that management information and other information are recorded into as phase-change marks to be reproduced later. The configuration of this outermost ring in the lead-in zone will be described in detail later by referring to FIG. 10 and subsequent figures.

The area having a radius of 24.0 mm to 58.0 mm is the data zone. The data zone is an area that data is actually recorded into as phase-change marks to be reproduced later.

The area having a radius of 58.0 mm to 58.5 mm is the lead-out zone. The lead-out zone also includes a defect management area similar to that of the led-in zone in addition to a buffer area, which allows an overrun to occur in a seek operation.

The area starting with the circumference having a radius of 23.1 mm, which is from the middle of the lead-in zone, and ending with the lead-out zone is the RW zone (or a recording/reproduction area) that phase-change marks are recorded into and reproduced from.

FIGS. 5A and 5B include diagrams showing the states of recording tracks in the RW and PB zones. To be more specific, FIG. 5A is a diagram showing the wobbling state of grooves in the RW zone whereas FIG. 5B is a diagram showing the wobbling state of grooves in the prerecorded-data zone in the PB zone.

In the RW zone, address information (ADIP) is embedded in advance for tracking purposes in a groove formed on the disc into a spiral-like shape by wobbling the groove.

Data is recorded onto the groove, which has the address information embedded therein, as phase-change marks to be reproduced later.

As shown in FIG. 5A, a track pitch TP of 0.32 microns is set for the groove formed in the RW zone to serve as a groove track having the embedded ADIP address information.

On the track, recording marks are recorded as phase-change marks. Phase-change marks are recorded on a track at a line recording density of 0.12 microns per bit or 0.08 microns per channel bit by adoption of a recording technique such as an RLL (1, 7) PP modulation method where RLL is an abbreviation of Run Length Limited and PP is an abbreviation of Parity preserved/Prohibit rmtr (repeated minimum transition runlength).

A mark length is in the range 2T to 8T and, thus, the minimum mark length is 2T where 1T is the length of 1 channel bit.

The address information is embedded in a track in the form of wobbling with a wobbling period of 69T and a wobbling amplitude WA of 20 nm (peak to peak).

The address information has a frequency band not overlapping the frequency band of the phase-change marks so that detection of the address information and detection of the phase-change marks do not affect each other.

A post-recording CNR (carrier noise ratio) of the address information embedded in a track in the form of wobbling is 30 dB for a bandwidth of 30 KHz. An address error rate including effects caused by perturbations such as disc skews, defocused states and external disturbances is not greater than $1 \times 10^{-3}$.

On the other hand, tracks implemented by the groove formed in the PB zone shown in FIG. 5B have a track pitch and a wobbling amplitude, which are greater than those of the tracks implemented by the groove formed in the RW zone shown in FIG. 5A.

To put it concretely, in the PB zone, the track pitch TP is 0.35 microns, the wobbling period is 36T, and the wobbling amplitude WA is 40 nm (p-p). The smaller wobbling period of 36T means that the line recording density of the prerecorded information is higher than the line recording density of the ADIP information embedded in the groove of the RW zone. In addition, since the phase-change marks recorded in the RW zone have the minimum length of 2T as described above, the line recording density of the prerecorded information is lower than the line recording density of the phase-change marks. No phase-change marks are recorded onto tracks in the PB zone.

The wobbling waveform in the RW zone can be sinusoidal while that in the PB zone can be sinusoidal or rectangular.

If the signal quality of the phase-change marks is a CNR of 50 dB for a bandwidth of 30 KHz, data can be recorded onto the disc by adding ECCs (Error Correction Codes) to the data and reproduced later from the disc. In this case, a symbolic error rate after error correction can be suppressed to a value not greater than $10^{-16}$ so that the phase-change marks can be used in operations to record and reproduce data onto and from the disc.

For the bandwidth of 30 KHz, the wobbling CNR of the ADIP information is 35 dB. This wobbling CNR of 35 dB is the wobbling CNR with no phase-change marks recorded as opposed to the post-recording CNR of 30 dB cited before.

For the address information, the signal quality having a value of this order is considered to be sufficient provided that interpolation protection based on the so-called continuity discrimination is carried out. For the prerecorded information recorded in the PB zone, however, it is also desired to assure a signal quality represented by a CNR of at least 50 dB as is the case with the signal quality of the phase-change marks. For this reason, as shown in FIG. 5B, the PB zone includes a groove formed as a groove physically different from the groove formed in the RW zone.

To put it concretely, in the prerecorded-data zone, in the first place, by increasing the track pitch, the amount of cross talk can be reduced and, by doubling the wobbling amplitude WA, the CNR can be improved by +6 dB.

In second place, by using a rectangular wave as the wobbling wave, the CNR can be further increased by +2 dB to give an improved CNR of 43 dB.

Differences in recording band between the phase-change marks and wobbles in the prerecorded-data zone is that, the length of a wobble is 18T, being equal to half the wobbling period of 36T while the length of a phase-change mark is set at 2T in some cases. In such cases, a further CNR increase of 9.5 dB can be gained.

Thus, the CNR of the prerecorded information can be increased to about 52.5 dB so that, even for an estimated cross-talk amount of −2 dB, a CNR of 50.5 dB can be achieved. That is to say, a signal quality of about the same order as that of the phase-change marks is obtained. As a result, the use of the wobbling signal in operations to record and reproduce prerecorded information is sufficiently proper.

FIG. 6 is a diagram showing a method of using prerecorded information for forming a wobbling groove in the prerecorded-data zone. The modulation process is an FM modulation process for producing FM codes.

FIG. 6(a) shows data bits and FIG. 6(b) shows a channel clock signal. FIG. 6(c) shows FM codes and FIG. 6(d) shows wobble waves.

A data-bit value of one is 2ch (two channel clock signal) to produce an FM code having a frequency equal to half the frequency of the channel clock signal. A data-bit value of zero is an FM code having a frequency equal to half the frequency of the FM code generated by the data-bit value of 1.

The wobble waveform recorded on the groove can be the rectangular waveform of the FM code without changes. In the case of the wobble waveform shown in FIG. 6(d), however, the rectangular waveform of the FM code is converted into a sinusoidal waveform.

It is to be noted that the FM codes and the wobble waveforms shown in FIGS. 6(c) and 6(D) respectively can be inverted to produce FM codes and wobble waveforms shown in FIGS. 6(e) and 6(f) respectively.

Assume that the FM code modulation rules described above are applied to a data-bit stream of '10110010' shown in FIG. 6(g). In this case, an FM code waveform and a sinusoidal wobble waveform are obtained as shown in FIGS. 6(h) and 6(I) respectively.

It is to be noted that, an FM code waveform and a sinusoidal wobble waveform are obtained as shown in FIGS. 6(j) and 6(k) respectively when the pattern corresponds to FIGS. 6(e) and 6(f) respectively.

2: ECC Format of Data

By referring to FIGS. 7, 8, and 9, the following description explains ECC formats of the phase-change marks and the prerecorded information.

First of all, refer to FIGS. 7A to 7D including diagrams showing ECC formats of main data (or user data) and management data, which are recorded and reproduced as phase-change marks.

As ECCs (Error Correction Codes), two different codes are used. One of the codes is an LDC (long distance code) provided for main data of 64 KB (=32 sectors×2048 bytes per sector). The other code is a BIS (Burst indicator subcode).

The 64 KB main data shown in FIG. 7A is subjected to an ECC encoding process as shown in FIG. 7B. In the ECC encoding process, a 4B EDC (error detection code) is added to every 2048B sector of the main data. The LDC is encoded for 32 sectors of the main data. The LDC is an RS (248, 216, 33) meaning an RS (reed solomon) code with a code length of 248, data of 216, and a distance of 33. There are 304 code words.

On the other hand, as shown in FIG. 7D, the BIS is subjected to an ECC encoding process for 720B data shown in FIG. 7C. The BIS is an RS (62, 20, 33) meaning an RS (reed solomon) code with a code length of 62, data of 30, and a distance of 33. There are 24 code words.

FIG. 9A is a diagram showing the frame structure of main data recorded in the RW zone.

Data including an LDC and BISes has the frame structure shown in the figure. As shown in the figure, the frame includes 38B data, a 1B BIS, 38B data, a 1B BIS, 38B data, a 1B BIS, and 38B data to give a frame length of 155B. That is to say, the frame forms data with total amount of 152B (=4 pieces×38B) and a 1B BIS inserted between each two successive 38B pieces of data.

A frame sink FS serving as a frame synchronization signal is placed at a position preceding the 155B frame structure. A block includes 496 frames.

As for the LDC included in the data, code words having even numbers 0, 2, and so on are positioned at frames having even numbers 0, 2, and so on respectively whereas code words having odd numbers 1, 3, and so on are positioned at frames having odd numbers 1, 3, and so on respectively.

The BIS is a code having an error correction power much superior to the LDC so that almost all errors can be corrected. This is because the BIS has a distance of 33 for a code length of 62.

Thus, a symbol of a BIS, which has already detected an error, can be used as follows.

In a process to decode an ECC, a BIS is decoded first. Assume that, in the frame structure shown in FIG. 9A, two errors have been detected in 38B data sandwiched by two consecutive BISes or between the frame sync FS and a BIS. In this case, the two errors are regarded as a burst error. An error pointer is assigned to each piece of 38B data. In the LDC, an error pointer is used for carrying out a pointer eraser process. In this way, in comparison with an error correction process based on only the LDC, the error correction power can be increased.

The BIS includes information such as an address. The address can be used in applications such as a ROM-typed disc in which no address information embedded in a wobbling groove is used.

Next, FIGS. 8A to 8D show an ECC format for prerecorded information. Also in this case, two different codes are used as ECCs. One of the codes is an LDC (long distance code) provided for main data of 4 KB (=2 sectors×2048 bytes per sector). The other code is a BIS (burst indicator subcode).

The 4 KB main data of prerecorded information shown in FIG. 8A is subjected to an ECC encoding process as shown in FIG. 8B. In the ECC encoding process, a 4B EDC (error detection code) is added to every 2048B sector of the main data. The LDC is encoded for two sectors of the main data. The LDC is an RS (248, 216, 33) meaning an RS (Reed Solomon) code with a code length of 248, data of 216, and a distance of 33. There are 19 code words.

On the other hand, as shown in FIG. 8D, the BIS is subjected to an ECC encoding process for 120B data shown in FIG. 8C. The BIS is an RS (62, 20, 33) meaning an RS (Reed Solomon) code with a code length of 62, data of 30 and a distance of 33. There are 4 code words.

FIG. 9B is a diagram showing the frame structure of prerecorded information recorded in the PB zone.

Data including an LDC and BISes has the frame structure shown in the figure. As shown in the figure, a frame forms a 1B frame sync FS, 10B data, a 1B BIS, and 9B data to give a frame length of 21B. That is to say, a frame includes 19B data and a 1B BIS inserted into the data.

The frame sink FS serving as a frame synchronization signal is placed at a position preceding the 21B frame structure. A block includes 248 frames.

Also in this case, the BIS is a code having an error correction power much superior to the LDC so that almost all errors can be corrected. Thus, a symbol of a BIS, which has already detected an error, can be used as follows.

In a process to decode an ECC, a BIS is decoded first. Assume that two errors have been detected in 10B or 9B data sandwiched by two consecutive BISes or between the frame sync FS and a BIS. In this case, the two errors are regarded as a burst error. An error pointer is assigned to each piece of 10B or 9B data. In the LDC, an error pointer is used for carrying out a pointer eraser process.

In this way, in comparison with an error correction process based on only the LDC, the error correction power can be increased.

The BIS includes information such as an address. In the prerecorded-data zone, prerecorded information has been recorded on the wobbling groove. Thus, since the wobbling groove does not include embedded addresses, an address included in a BIS is used in making an access to the prerecorded information.

As is obvious from FIGS. 7 and 8, data recorded as phase-change marks and prerecorded information have the same codes and same structure in the ECC format.

Since an ECC decoding process for prerecorded information can be carried out by using a circuit for carrying out an ECC decoding process in reproducing data recorded as phase-change marks, the hardware configuration of the disc drive apparatus can be made more efficient.

3: Defect Management Area 3-1: Information Area Including a DMA

The following description explains the configuration of the defect management area included in a region in which the lead-in zone overlaps the RW zone.

As described earlier by referring to FIG. 4, the lead-in zone is a disc inner-side circular zone enclosed by a circumference having a radius of 24 mm. The outermost ring in the lead-in zone, that is, the ring having a radius of 23.1 mm to 24 mm, is a portion common to the RW zone.

Figure 10:
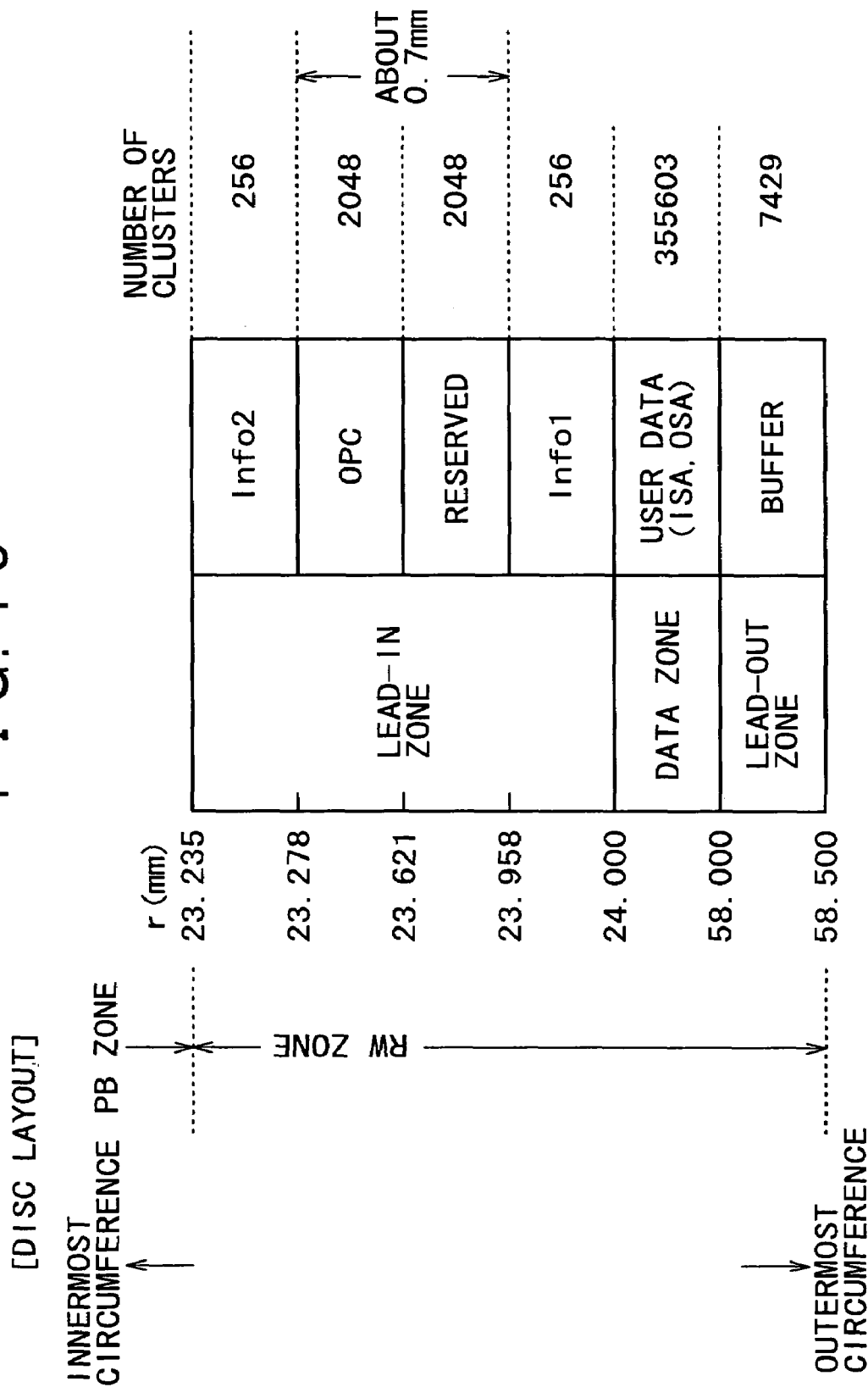
FIG. 10 is an explanatory diagram showing the configuration of a lead-in zone according to the embodiment.

FIG. 10 is a diagram showing the range of the RW zone. As shown in the figure, the RW zone includes the aforementioned ring in the lead-in zone, the data zone, and a lead-out zone. For each zone and area in the RW zone, the number of clusters is shown.

It is to be noted that a cluster is a 64 KB data unit including 32 sectors that each have a length of 2048 bytes.

As shown in FIG. 10, the ring in the lead-in zone includes an information area Info2, a test write area OPC, a reserved area, and an information area Info1. The information area Info2 is a ring-shaped segment having a radius of 23.235 mm to 23.278 mm. The test write area OPC is a ring-shaped segment having a radius of 23.278 mm to 23.621 mm. The reserved area is a ring-shaped segment having a radius of 23.621 mm to 23.958 mm. The information area Info1 is a ring-shaped segment having a radius of 23.958 mm to 24.000 mm.

The information areas Info1 and Info2 each include the defect management area DMA and a control data area. The defect management area DMA is an area for storing defect management information whereas the control data area is an area for recording control information.

The test write area OPC is an area for testing recording and reproduction conditions. To put it concretely, data is written into the test write area OPC on a trial basis in order to optimize the conditions such as the power of a recording laser.

The reserved area is a spare area to be used in the future.

Data of the recording and reproduction density includes a track pitch of 0.32 microns and a line density of 0.12 microns/bit. If data of an amount of 64 kB is recorded onto and reproduced from the disc as one cluster, the information area Info2 has a storage capacity of 256 clusters, the test write area OPC has a storage capacity of 2048 clusters, the reserved area has a storage capacity of 2048 clusters, and the information area Info1 has a storage capacity of 256 clusters.

The data zone is a zone that user data is recorded into and reproduced from. The data zone has a storage capacity of 355603 clusters. Thus, user data of an amount of about 23.3 GB (=64 KB×335603 clusters) can be recorded onto and reproduced from the data zone.

The lead-out zone has a storage capacity of 7429 clusters. The lead-out zone is a zone for storing data similar to that recorded in the information areas Info1 and Info2. Thus, the data stored in the lead-out zone includes data recorded in the defect management area DMA and the control data area.

FIGS. 11A and 11B are diagrams showing the data structures of the information areas Info1 and Info2 respectively.

As shown in FIG. 11A, the information area Info1 includes a first buffer, a drive area, a reserved area, a defect management area DMA1, a control data area CDA1, and a second buffer.

The first buffer is an area for separating the drive area shown in FIG. 11A from the reserved area shown in FIG. 10. The first buffer area has a size of 32 clusters.

The drive area is a region used as an area for storing optimum recording and reproduction conditions of the disc as data. Found as a result of operations to write data into the test write area OPC on a trial basis, the optimum recording and reproduction conditions include optimum values. The drive area has a storage capacity of 32 clusters.

The reserved area is a spare area to be used in the future. The reserved area has a size of 96 clusters.

The defect management area DMA1 is an area for recording and reproducing defect management information, which is the same information recorded in defect management area DMA2. The defect management area DMA1 has a storage capacity of 32 clusters.

The control data area CDA1 is an area for recording and reproducing information, which is the same information recorded in the control data area CDA2. The control data area CDA1 has a storage capacity of 32 clusters.

The second buffer is an area for separating the control data area CDA1 from the data zone. The second buffer area has a size of 32 clusters.

As shown in FIG. 11B, the information area Info2 includes a reserved area, a defect management area DMA2, a control data area CDA2, and a buffer.

The reserved area is a spare area to be used in the future. The reserved area has a size of 160 clusters. The defect management area DMA2 has a storage capacity of 32 clusters. The control data area CDA2 is an area for recording control information. The control data area CDA2 has a storage capacity of 32 clusters.

The buffer is an area for separating the control data area CDA2 from the test write area OPC. The buffer area has a size of 32 clusters.

As is obvious from FIG. 10, the information area Info1 including the defect management area DMA1 is formed in a region separated away from a region provided for the information area Info2 including the defect management area DMA2 in the radial direction of the disc. In addition, the information areas Info1 and Info2 are separated away from each other in the radial direction of the disc sandwiched the test write area OPC and the reserved area therebetween. In this embodiment, the information areas Info1 and Info2 are separated away from each other in the radial direction of the disc by a distance of about 0.7 mm.

Thus, even if the defect management area DMA of a specific one of the information areas Info1 and Info2 is damaged by an injury or a defect, it is all but out of the bounds of possibility that the damage has an effect on the defect management area DMA of the other one of the information areas Info1 and Info2. That is to say, there is almost no case that the two defect management areas DMA1 and DMA2 are damaged simultaneously so that recording and reproduction operations cannot be carried out on both the areas. In this way, the reliability of the defect management areas DMA can be improved.

The effect of the separation of defect management areas DMA1 and DMA2 from each other also holds true of the control data areas CDA1 and CDA2 as well. That is to say, there is almost no case that the two control data areas CDA1 and CDA2 are damaged simultaneously so that recording and reproduction operations cannot be carried out on both the areas. Thus, the reliability of the control data areas CDA can also be improved.

As is obvious from FIG. 10, the test write area OPC is the largest among the areas in the portion included in the lead-in zone excluding the reserved area. Thus, by designing a layout in which the information areas Info1 and Info2 sandwich at least the test write area OPC, the information areas Info1 and Info2 are separated away from each other in the radial direction of the disc effectively. The information areas Info1 and Info2 are deliberately separated away from each other for the purpose of providing a desirable layout in which a damage of one of the information areas has no effect on the other information area.

3-2: DMA Structure Having Spare Areas

The following description explains data structures of the defect management areas DMA, namely, DMA1 and DMA2, included in the information areas Info1 and Info2 respectively.

FIG. 12 is a diagram showing the data structure of the defect management areas DMA, namely, DMA1 and DMA2.

As shown in FIGS. 11A and 11B, the defect management areas DMA, namely, DMA1 and DMA2, each have a storage capacity of 32 clusters. In the data structure shown in FIG. 12, a cluster number in the range 1 to 32 is assigned to each of the clusters to indicate the data position of each piece of information stored in the defect management area DMA. The size of each piece of information is expressed as the number of clusters.

The defect management area DMA includes a segment, which consists of four clusters identified by cluster numbers 1 to 4. Each of the clusters is used for storing a DDS (disc definition structure).

The contents of a DDS will be described by referring to FIG. 13. A DDS thus has a size of one cluster. Accordingly, in the segment consisting of four clusters, four successive disc definition structures DDS are recorded in four consecutive locations.

A segment consisting of four clusters identified by cluster numbers 5 to 8 is used as a first position of a defect list DL.

A segment consisting of four clusters identified by cluster numbers 9 to 12 is used as a second position of the defect list DL.

Thereafter, a segment consisting of four clusters is provided for each of third and subsequent positions of the defect list DL. Finally, a segment consisting of four clusters identified by cluster numbers 29 to 32 is used as a seventh position of the defect list DL.

That is to say, in the defect management area DMA having a size of 32 clusters, seven positions, namely, the first to seventh positions, are each provided for the defect list DL.

As will be described later, the defect list DL is used for recording data of an amount of four clusters, which will be explained by referring to FIG. 14. Initially, the defect list DL is recorded at the first position. The second to seventh positions are each used as a spare area of the position of the defect list DL.

FIG. 13 is a diagram showing the contents of the DDS.

As described earlier, the DDS has a size of one cluster (=32 sectors). Each data frame shown in FIG. 13 occupies a sector having 2048 bytes. Thus, the DDS with a size of one cluster has data frames 0 to 31.

A byte position in a data frame is the location of the first byte in the data frame. A byte count of a data item is the number of bytes.

The first data frame or data frame 0 is used for defining each data item.

Two bytes starting from byte position 0 is used for recording a DDS identifier indicating that the cluster is a DDS cluster.

One byte at byte position 2 is used for showing a version of the DDS format.

Four bytes starting from byte position 4 are used for recording a DDS update count.

Four bytes starting from byte position 16 are used for recording a first PSN (physical sector number) of the drive area. Used to represent the start position of the drive area, this first PSN is the sector physical address of the first sector in the drive area.

Four bytes starting from byte position 24 are used for recording a first PSN of the defect list DL. Used to represent the start position of a defect list DL, this first PSN is the sector physical address of the first sector in the defect list DL.

Four bytes starting from byte position 32 are used for recording a PSN representing the position of an LSN (Logical Sector Number) of 0 in a user data area of the data zone. The user data area will be explained later by referring to FIG. 16.

Four bytes starting from byte position 36 are used for recording a PSN representing the position of the last LSN of the user data area in the data zone.

Four bytes starting from byte position 40 are used for recording the size of an ISA (inner spare area) in the data zone.

Four bytes starting from byte position 44 are used for recording the size of an OSA (outer spare area) in the data zone.

One byte at byte position 52 is used for storing a full flag for the inner spare area ISA and the outer spare area OSA. A full flag is a flag indicating whether or not a spare area is full.

One byte at byte position 54 is used for storing a disc certification flag for indicating whether or not the disc has been certified by carrying a checking operation such as a verification process on the disc.

Four bytes starting from byte position 56 are used for recording a last address pointer in the verification process carried out on the disc.

Bytes other those described above and data frames 1 to 31 are reserved in the data frame 0.

Next, the data structure of the defect list DL is explained by referring to FIG. 14. As described earlier by referring to FIG. 12, the defect list DL is stored in a recording area with a storage capacity of four clusters.

A cluster number/data frame in the data structure shown in FIG. 14 indicates the position of a data item in the defect list DL having a size of four clusters. It is to be noted that 1 cluster=32 data frames and one data frame=2048 bytes.

A byte position in a data frame is the location of the head of the data item in the data frame.

A byte count is the number of bytes, that is, the size of the data item.

The first 64 bytes of the defect list DL are a data item known as the header of the defect list DL.

The header of the defect list DL includes data such as information that the clusters are clusters of the defect list DL, a version, the number of defect-list updates, and the number of entries in the defect list DL.

An area used for storing a list of defects follows the header of the defect list DL. The list of defects includes entries of the defect list DL.

Each entry has a data structure to be described later by referring to FIG. 15. The area used for storing a list of defects starts at byte 64 of cluster 0/data frame 0.

A defect list terminator having a length of 8 bytes immediately follows the list of defects.

The first 4 bytes of the defect list terminator is an identifier of 'FF FF FF FFh' indicating that these 4 bytes are a defect list terminator.

The following 4 bytes are used for storing the number of defect-list updates. The number of defect-list updates has the same value as the number of defect-list updates, which is recorded in the header of the defect list DL. These 4 bytes are recognized as the end of the defect list DL. The remaining bytes are reserved bytes.

Figure 15:
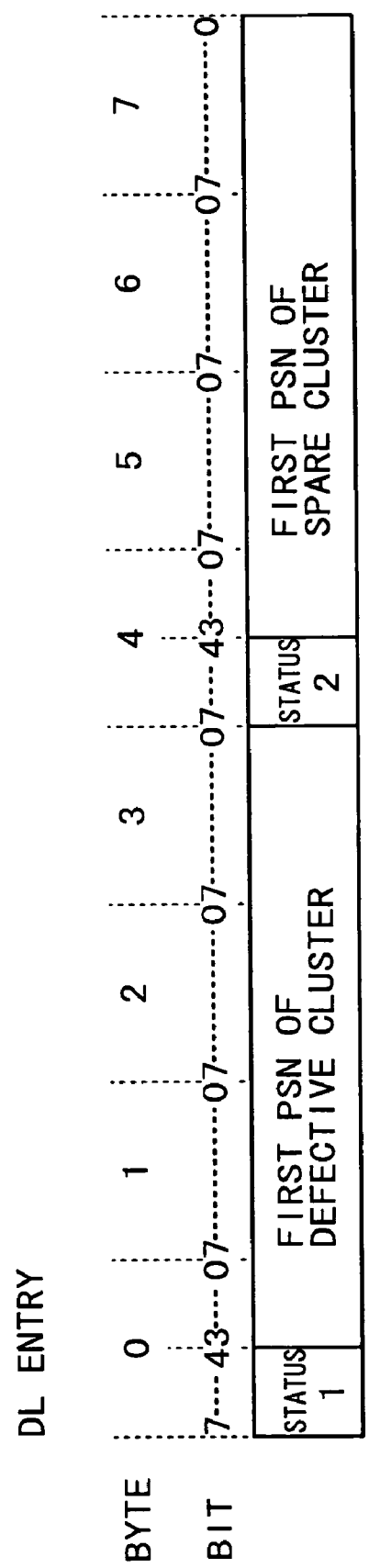
FIG. 15 is an explanatory diagram showing an entry of the defect list stored in the DMA according to the embodiment.

FIG. 15 is a diagram showing the data structure of each of DL entries recorded in the list of defects.

A DL entry has a length of 8 bytes (=64 bits), from byte 0 to byte 7. Each byte consists of bits 0 to 7.

Bits 7 to 4 of byte 0 of the entry (i) are used for recording status information (status 1) of the entry.

Status 1 information includes on an other entry replaced by this entry, entries each usable as a spare entry for this entry, and entries each unusable as a spare entry for the entry.

Thirty bits consisting of bits 3 to 0 of byte 0 and bits of bytes 1 to 3 of the entry are used for storing the first PSN of a defective cluster. The first PSN of a defective cluster is the physical address of the first sector of the defective cluster. That is to say, a cluster regarded as a defective cluster replaced by a spare cluster is represented by this first PSN, which is the physical address of the first sector of the defective cluster.

Bits 7 to 4 of byte 4 of the entry are used for recording other status information (status 2) of the entry. The status information (status 2) are reserved.

Thirty bits consisting of bits 3 to 0 of byte 4 and bits of bytes 5 to 7 are used for storing the first PSN of a spare cluster. The first PSN of a spare cluster is the physical address of the first sector of the spare cluster. That is to say, if the defective cluster is replaced by the spare cluster, the spare cluster used as a substitute for the defective cluster is represented by this first PSN, which is the physical address of the first sector of the spare cluster.

As described above, a DL entry shows a cluster treated as a defective cluster and, if an alternate-cluster process to replace the defective cluster with a spare cluster is carried out, the spare cluster used as an area serving as a substitute for the defective cluster is also shown in the defect list DL entry.

Such an entry is then cataloged in the defect list DL (or a list of defects) with the data structure shown in FIG. 14.

As shown in FIG. 12 explained before, a defect management area DMA has seven areas, which can each be used for storing the defect list DL shown in FIG. 14.

The defect list DL is updated by typically added new entries in accordance with the state of defective clusters. When the defect list DL is updated, processes accompanying the operation to update the defect list DL are carried out. The processes include an operation to renew an update count included in the header of the defect list DL as the number of defect-list updates. That is to say, information stored in the defect management areas is updated from time to time if necessary.

Initially, the defect list DL is recorded at the first position of DL in the defect management area DMA. At that time, an initial number of defect-list updates is cataloged in the header of the defect list DL and renewed thereafter.

Assume for example that, at a certain point of time, the number of defect-list updates reaches 1000 or the recorded defect list DL cannot be reproduced for some reasons. In such a case, the area for recording the defect list DL needs to be replaced with a spare recording area. To put it concretely, the defect list DL is hereafter recorded at the second position of the defect list DL.

By the same token, if the number of defect-list updates reaches 1000 or the recorded defect list DL cannot be reproduced thereafter, the remaining recording areas provided for the defect list DL, namely, the third to seventh positions of the defect list DL are each used one area after another as a replacement.

By providing a plurality of recording areas, namely, the first to seventh positions of the defect list DL, in a defect management area DMA as an active area currently used for storing the defect list DL serving as actual defect management information and spares areas each to be used as a substitute for the currently used area as described above, the currently used area can be replaced with one of the spare areas in accordance with parameters such as the number of defect-list updates and/or the status of an error. That is to say, since the number of defect-list updates indicates the number of overwrite operations, the active area currently used for storing the defect list DL can be replaced with one of the spare areas as the number of defect-list updates reaches a predetermined limit.

Information is recorded into a defect management area DMA by adoption of a phase-change recording method for which a limit on the number of overwrite operations is known. By replacing an active area currently used with one of spare areas as described above, the problem of exceeding the limit on the number of overwrite operations can be solved. Thus, it is possible to record and reproduce information into and from a reliable defect management area DMA.

In addition, as explained earlier by referring to FIGS. 11A and 11B, in the lead-in zone, there are actually two defect management areas DMA, namely, DMA1 and DMA2. Moreover, in some cases, an other defect management area is provided in the lead-out zone.

The same information is recorded into the defect management areas DMA1, DMA2, and the other defect management area sequentially, one area after another, in an order these areas are enumerated.

It is possible to determine as to whether or not information stored in a specific defect management area DMA is the same as information stored in an other defect management area DMA by the recording update count recorded in the DDS of the defect management area DMA and by the recording update count recorded in the header of a defect list DL stored in the specific defect management area DMA.

If the information stored in the specific defect management area DMA is found different from the information stored in the other defect management area DMA, the pieces of information stored in these defect management areas DMA are made uniform by copying the information stored in an earlier one to later one by prioritizing the following order: DMA1, DMA2, and so on.

3-3: Spare Areas of Data Zone

The following description explains areas included in the data zone as spare areas managed by using the defect list DL.

Figure 16:
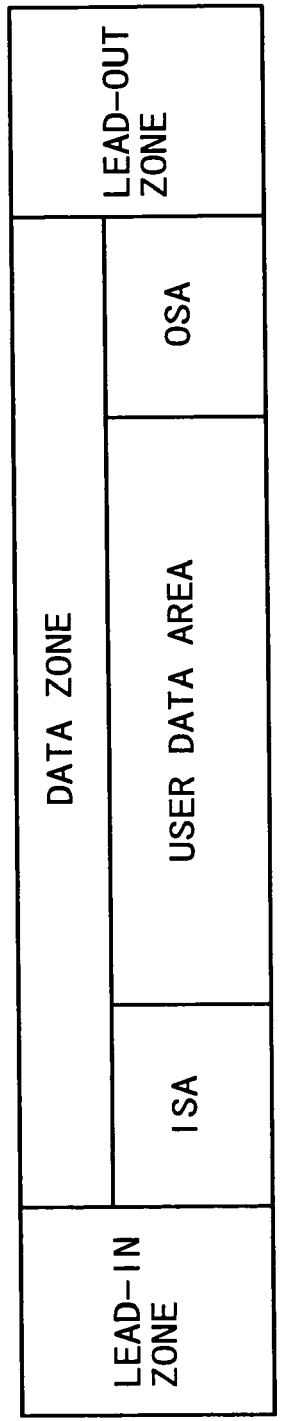
FIG. 16 is an explanatory diagram showing an ISA and an OSA of a data zone according to the embodiment.

FIG. 16 is a diagram showing a disc layout including the spare areas allocated in the data zone.

The data zone includes a user-data area, which user data is recorded into and reproduced from. In addition to the user-data area, the data zone also includes spare areas as follows.

An ISA (inner spare area) is a spare area on the inner side. The ISA includes 2048 clusters to give a storage capacity of 128 MB. On the other hand, an OSA includes 16384 clusters to give a storage capacity of 1024 MB. The ISA has a fixed size while the OSA has a variable size.

First of all, the DDS of the defect management area DMA shown in FIG. 12 is subjected to an initialization-formatting process to record information, which includes a fixed inner spare size and an initial value of the variable outer spare size, into the DDS. Thus, the ISA size cannot be changed after the initialization-formatting process.

On the other hand, the OSA size can be changed even after the initialization-formatting process. In the case of a disc used in an apparatus such as a personal computer, for example, it is desirable to have a long duration of an operation to record an AV stream (or audio/video stream data) onto the disc and, hence, a long duration of an operation to reproduce an AV stream from the disc. In order to have such long durations, it is necessary to reduce the size of the spare area. To improve the reliability of operations to store and reproduce PC data onto and from a disc, however, it is desirable to have a large size of the spare area.

In order to meet both the requirements described above, when a disc is switched from operations to store and reproduce PC data onto and from the disc to operations to record and reproduce an AV stream onto and from the disc in the course of an application of the disc after the initialization-formatting process, it is proper to change the size of the OSA in a size-decreasing direction. When the disc is switched from operations to store and reproduce an AV stream onto and from the disc to operations to record and reproduce PC data onto and from the disc, on the other hand, it is proper to change the size of the OSA in a size-increasing direction.

It is to be noted that, in the case of a disc used exclusively for operations to store and reproduce an AV stream onto and from the disc, the sizes of the spare areas ISA and OSA are both set at 0. To put it concretely, the ISA size (inner spare area size) and ISA size (outer spare area size) in the DDS are set at 0.

In this case, the data zone is all used as a user-data area. In addition, if a defective cluster is detected, only the defective cluster is cataloged in an entry of the defect list DL. However, no replacement cluster is cataloged in the entry.

That is to say, in this case, the cluster-replacement process is not carried out on the defective cluster. Instead, the defective cluster is merely cataloged as an unusable cluster.

Thus, in this case, there is required no time it takes to carry out a process to seek for a spare cluster in a recording or reproduction operation. As a result, this scheme is suitable for operations to record and reproduce an AV stream onto and from the disc on a real-time basis.

In addition, since no spare area is allocated to alternate clusters, it is possible to increase the size of the usable user-data area as well as the durations of the recording and reproduction operations.

4: Disc Drive Apparatus

The following description explains a disc drive apparatus for recording and reproducing data onto and from an optical disc 1 like the one described above.

This disc drive apparatus formats an optical disc 1 into a disc, which has layouts like the ones described by referring to FIG. 4 and FIGS. 10 to 16, by carrying out a formatting process on the optical disc 1. The formatting process is carried out by recording information onto the optical disc 1 on which a wobbling groove has already been formed to serve as a PB zone and an RW zone as described earlier, by adoption of the phase-change recording method.

Then, the disc drive apparatus records and reproduces data onto and from the formatted optical disc 1 by adoption of the phase-change recording method.

It is needless to say that the disc management areas DMA are also updated and/or information is also recorded onto the disc management areas DMA during the formatting process or when necessary.

Figure 17:
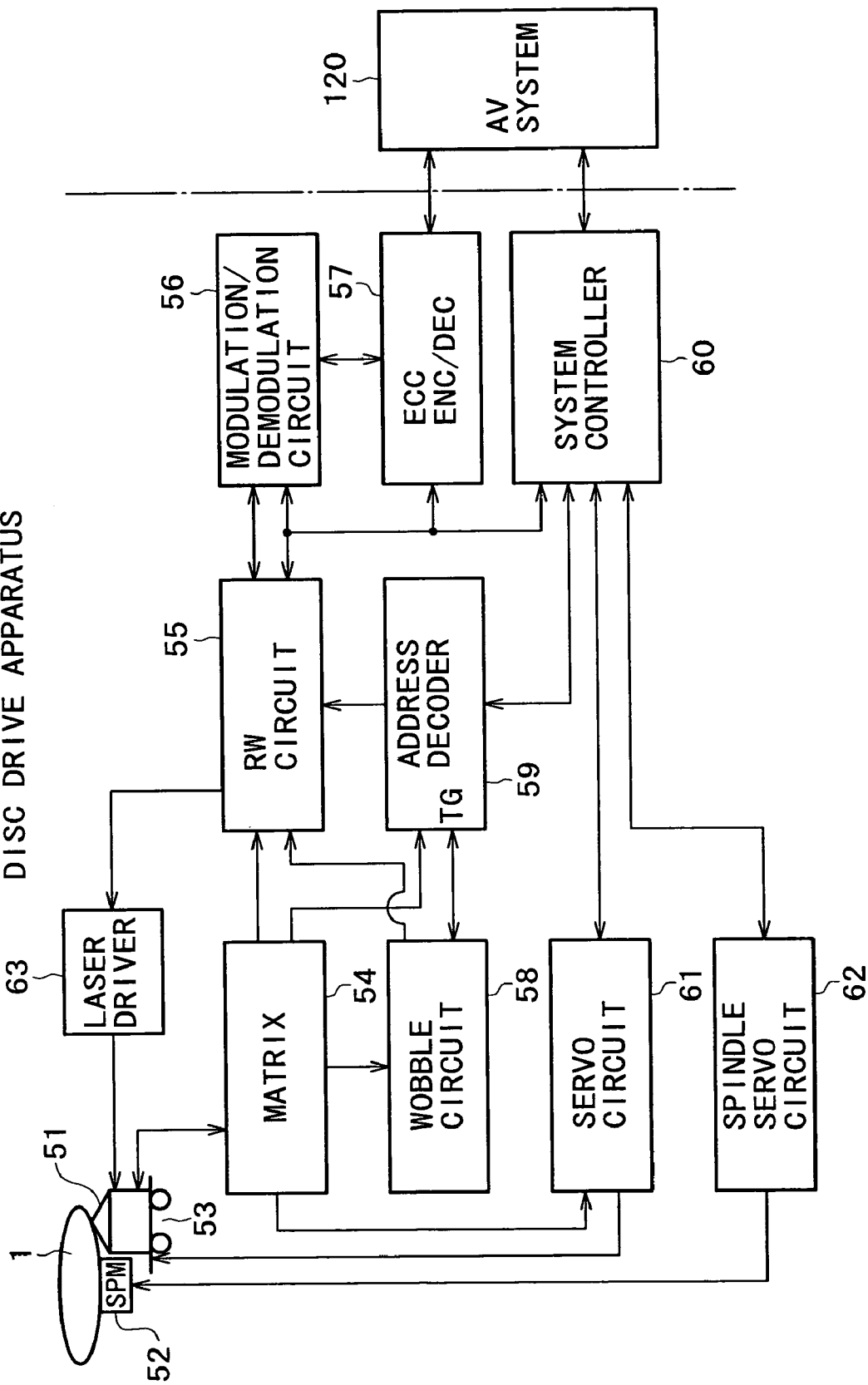
FIG. 17 is a block diagram showing a disc drive apparatus implemented by an embodiment of the present invention.

FIG. 17 is a block diagram showing the configuration of the disc drive apparatus. The optical disc 1 is mounted on a turntable not shown in the figure. In recording and reproduction operations, a spindle motor 52 drives the optical disc 1 into rotation at a constant line velocity (CLV).

Then, an optical pickup (or an optical head) 51 reads out ADIP information embedded as wobbling of a groove track in the RW zone of the optical disc 1. The optical pickup 51 also reads out prerecorded information embedded as a wobbling shape of a groove track in the PB zone of the optical disc 1.

In the initialization-formatting process or in an operation to record user data onto the optical disc 1, the optical pickup 51 stores respectively management information or user data onto a track in the RW zone as phase-change marks. In a reproduction operation, on the other hand, the optical pickup 51 reads out recorded phase-change marks from a track in the RW zone.

The optical pickup 51 includes a laser diode, a photo detector, an objective lens, and an optical system, which are not shown in the figure. The laser diode serves as a laser source for generating a laser beam. The photo detector detects a reflected beam. The objective lens is an output terminal of the laser beam generated by the laser source. The optical system radiates the laser beam to the recording face of the optical disc 1 by way of the objective lens and guides the reflected beam to the photo detector.

The laser diode generates the so-called blue laser having a wavelength of 405 nm. The NA of the optical system is 0.85.

The objective lens is supported inside the optical pickup 51 in such a way that a two-axis mechanism is capable of moving the objective lens in tracking and focus directions.

In addition, a thread mechanism 53 is capable of moving the whole optical pickup 51 in the radial direction of the optical disc 1.

The laser diode employed in the optical pickup 51 generates a laser beam as driven by a drive current output by a laser driver 63 to serve as a drive signal.

The photo detector detects information conveyed by a beam reflected by the optical disc 1. That is to say, the photo detector generates an electrical signal according to the light quantity of the reflected beam and supplies the electrical signal to a matrix circuit 54.

The photo detector includes a plurality of light-receiving elements, which output currents as the electrical signal to the matrix circuit 54 including a current-to-voltage conversion circuit and a matrix-processing/amplification circuit. The matrix circuit 54 carries out a matrix-operation process on the electrical signal to generate necessary output signals.

The output signals include a high-frequency signal (or a reproduced data signal) representing reproduced data as well as a focus-error signal and a tracking-error signal, which are used for executing servo control.

In addition, the matrix circuit 54 also outputs a push-pull signal related to the wobbling shape of the groove as a result of detection of the wobbling shape.

The matrix circuit 54 supplies the reproduced data signal to a reader/writer circuit 55, the focus-error signal and the tracking-error signal a servo circuit 61, and the push-pull signal to a wobble circuit 58.

The reader/writer circuit 55 carries out a binary conversion process and a reproduction-clock generation process by PLL on the reproduced data signal in order to reproduce data read out from the optical disc 1 as phase-change marks. The reader/writer circuit 55 then supplies the reproduced data to a modulation/demodulation circuit 56.

The modulation/demodulation circuit 56 has a functional member to serve as a decoder in a reproduction operation and a functional member to serve as an encoder in a recording operation.

As a decoding process carried out in a reproduction operation, the decoder performs demodulation processing on the basis of a reproduction clock signal to generate a run length limited code.

An ECC encoder/decoder 57 carries out an ECC encoding process to add error correction codes to data to be recorded onto the optical disc 1 in a recording operation and an ECC decoding process to correct errors contained in data reproduced from the optical disc 1 in a reproduction operation.

In a reproduction operation, the ECC encoder/decoder 57 stores data obtained as a result of a demodulation process carried out by the modulation/demodulation circuit 56 in an internal memory. The ECC encoder/decoder 57 then carries out various kinds of processing such as an error detection/correction process and a de-interleaving process on the stored data to generate reproduced data.

The reproduced data completing the decoding process carried out by the ECC encoder/decoder 57 is read out, being transferred to an AV (Audio-Visual) system 120 in accordance with a command issued by a system controller 60.

The wobble circuit 58 processes the push-pull signal received from the matrix circuit 54 as a signal related to the wobbling shape of the groove. To be more specific, the wobble circuit 58 carries out MSK and HMW demodulation processes on the push-pull signal, which conveys ADIP information, to produce a data stream representing the ADIP information. The wobble circuit 58 then supplies the data stream to an address decoder 59.

The address decoder 59 decodes the data stream supplied thereto to produce addresses and then supplies the addresses to the system controller 60.

In addition, in order to generate a clock signal, the address decoder 59 carries out a PLL process using the wobble signal received from the wobble circuit 8. The address decoder 59 then outputs the clock signal to other components for example as a clock signal for encoding processes carried out in a recording operation.

The push-pull signal generated by the matrix circuit 54 as a signal related to the wobbling shape of the groove may be a push-pull signal conveying prerecorded information recorded in the PB zone. In the wobble circuit 58, such a push-pull signal is subjected to a band-pass filter process before being supplied to the reader/writer circuit 55. The reader/writer circuit 55 carries out a binary conversion process on data obtained as a result of the band-pass filter process in the same way as phase-change marks to produce a data bit stream. The reader/writer circuit 55 outputs the data bit stream to the ECC encoder/decoder 57. The ECC encoder/decoder 57 then carries out an ECC decoding process and a de-interleaving process on the data bit stream to extract the prerecorded information, which is supplied to the system controller 60.

The system controller 60 is capable of carrying out, among other processes, various kinds of processing including a copy protection process on the basis of the extracted prerecorded information.

In a recording operation, on the other hand, data to be recorded is received from the AV system 120. The data to be recorded is stored in a memory employed in the ECC encoder/decoder 57 to serve as a buffer.

In this case, the ECC encoder/decoder 57 carries out ECC encoding processes on the data stored in the buffer. The ECC encoding processes include a process to add error correction codes, an interleaving process, and a process.

Data completing the ECC encoding processes is supplied to the modulation/demodulation circuit 56 to be subjected to a modulation process adopting the RLL (1-7) PP method. A result of the modulation process is supplied to the reader/writer circuit 55.

A reference clock signal used in these encoding processes carried out in a recording operation is the clock signal generated from the wobble signal as described above.

Data generated by these encoding processes as data to be recorded is subjected to a recording compensation process carried out by the reader/writer circuit 55 before being output to the laser driver 63 as laser drive pulses. The recording compensation process includes fine adjustment of a recording power and adjustment of the waveform of the laser drive pulses. The recording power is adjusted to result in a magnitude optimum for parameters such as the characteristics of the recording layer, the spot shape of the laser beam, and the recording line velocity.

The laser driver 63 supplies the laser drive pulses received thereby to the laser diode employed in the optical pickup 51. The laser drive pulses drive the laser diode to emit a laser beam. The laser beam forms pits (or phase-change marks) on the optical disc 1 in accordance with the data being recorded.

It is to be noted that the laser driver 63 has the so-called APC (Auto Power Control) circuit for controlling the output power of the laser beam to a constant value independent of the temperature and other conditions by monitoring the output power of the laser beam from the output of a detector provided in the optical pickup 51 as a means for detecting the output power of the laser beam. The laser driver 63 receives target values for recording and reproduction operations from the system controller 60. Thus, in recording and reproduction operations, the APC circuit controls the output power of the laser beam to the respective target values.

The servo circuit 61 generates a variety of servo drive signals from the focus-error and tracking-error signals received from the matrix circuit 54, outputting the servo drive signals to the focus, tracking, and thread mechanisms to drive their servo operations.

To put it in detail, the servo circuit 61 generates a focus drive signal and a tracking drive signal in accordance with the focus error signal and the tracking error signal, outputting the focus drive signal and the tracking drive signal to the optical pickup 51 in order to drive a focus coil and a tracking coil, which are employed in the two-axis mechanism provided in the optical pickup 51. In this way, the optical pickup 51, the matrix circuit 54, the servo circuit 61, and the two-axis mechanism form a tracking servo loop and a focus servo loop.

The servo circuit 61 may turn off the tracking servo loop in accordance with a track jump command received from the system controller 60. With tracking servo loop turned off, the servo circuit 61 outputs a jump drive signal to carry out a track jump operation.

In addition, the laser driver 63 also outputs a thread drive signal for driving the thread mechanism 53. The servo circuit 61 generates the thread drive signal on the basis of a thread error signal or in accordance with access execution control executed by the system controller 60. The thread error signal is obtained as a low-frequency component of the tracking error signal. The thread mechanism 53 is a mechanism based on components such as a propagation gear, a thread motor, and a main shaft for holding the optical pickup 51. It is to be noted that these components are not shown in the figure. The thread drive signal drives the thread motor to move the optical pickup 51 in a predetermined slide movement.

A spindle servo circuit 62 executes control to rotate the spindle motor 52 at a CLV.

To put it in detail, the spindle servo circuit 62 obtains the frequency of a clock signal as the present rotational speed of the spindle motor 52 and compares the present rotational speed with a predetermined CLV reference speed to generate a spindle error signal. The clock signal is a signal generated by a PLL process carried out for the wobble signal.

By the same token, in an operation to reproduce data from the optical disc 1, the spindle servo circuit 62 obtains the frequency of a reproduction clock signal as the present rotational speed of the spindle motor 52, and compares the present rotational speed with a predetermined CLV reference speed to generate a spindle error signal. Generated by a PLL inside the reader/writer circuit 55, the reproduction clock signal is a signal used as a reference signal of a decoding process.

Then, the spindle servo circuit 62 outputs a spindle drive signal generated in accordance with the spindle error signal to the spindle motor 52 to drive the spindle motor 52 into rotation at the CLV.

The spindle servo circuit 62 also generates a spindle drive signal in accordance with a spindle-kick and spindle-break signals received from the system controller 60. The spindle servo circuit 62 outputs such a spindle drive signal to the spindle motor 2 to start, stop, accelerate or decelerate the spindle motor 2.

The variety of operations carried out by the servo system and the recording/reproduction system are controlled by system controller 60, which is based on a microcomputer. The system controller 60 carries out various kinds of processing in accordance with commands received from the AV system 120.

Assume for example that the AV system 120 issues a write command to the system controller 60. In this case, first of all, the system controller 60 moves the optical pickup 51 to an address at which data received from the AV system 120 is to be written. Then, the ECC encoder/decoder 57 and the modulation/demodulation circuit 56 carry out encoding processes described before on the data. Examples of the data are audio data and video data generated in accordance with a variety of methods including the MPEG2 technique. Finally, the reader/writer circuit 55 supplies laser drive pulses to the laser driver 63 to record the data onto the optical disc 1 as explained earlier.

As another example, assume that the AV system 120 issues a read command to the system controller 60, requesting that recorded data such as MPEG2 video data be reproduced from the optical disc 1. In this case, first of all, a seek operation to a target position at an address specified in the read command is carried out. To put it in detail, the spindle servo circuit 62 issues a seek command to the servo circuit 61, requesting the servo circuit 61 to drive the optical pickup 51 to move, making an access to a target at an address specified in the seek command.

Then, control is executed to carry out necessary operations transferring requested data stored in a segment at the specified address to the AV system 120. To put it in detail, the data is read out from the optical disc 1 and subjected to decoding and buffering processes in the reader/writer circuit 55, the modulation/demodulation circuit 56, and the ECC encoder/decoder 57 before being transferred to the AV system 120.

It is to be noted that, in the operations to record and reproduce data onto and from the optical disc 1 as phase-change marks, the system controller 60 controls the recording and reproduction operations and accesses accompanying the operations by using ADIP addresses detected by the wobble circuit 58 and the address decoder 59.

In addition, at points of time such that the optical disc 1 is mounted on the disc drive apparatus, the system controller 60 reads out a unique ID recorded in the BCA of the optical disc 1 and prerecorded information stored in the prerecorded-data zone PR of the optical disc 1 as information embedded in a wobbling groove.

In this case, first of all, a seek operation is carried out with the BCA and the prerecorded-data zone PR used as targets. That is to say, the system controller 60 issues commands to the servo circuit 61, requesting the servo circuit 61 that the optical pickup 51 be moved to the inner-circumference side of the optical disc 1 to make accesses to the BCA and the prerecorded-data zone PR.

Then, the optical pickup 51 is driven to carry out a reproduction tracing operation for generating a reflected beam conveying information represented by a push-pull signal. Then, the wobble circuit 58, the reader/writer circuit 55, and the ECC encoder/decoder 57 are driven to carry out decoding processes to generate BCA information and prerecorded information as reproduced information.

The system controller 60 then sets laser powers and carries out a copy protect process on the basis of the BCA information and the prerecorded information read out from the optical disc 1 as described above.

It is to be noted that, in the operation to reproduce the prerecorded information from the optical disc 1, the system controller 60 controls the reproduction operation and accesses accompanying the operation by using address information included in a BIS cluster as the prerecorded information read out from the optical disc 1.

By the way, while the embodiment shown in FIG. 17 implements the disc drive apparatus connected to the AV system 120, the disc drive apparatus provided by the present invention can be connected to, for example, a personal computer or the like.

In addition, the disc drive apparatus provided by the present invention can be a stand-alone apparatus not connected to any equipment. In this case, the disc drive apparatus is provided with an operation unit and a display unit. As an alternative, the disc drive apparatus is so designed that the configuration of members for interfacing with data inputs and outputs is different from that shown in FIG. 17. That is to say, it is nice to construct the disc drive apparatus into a configuration in which data is recorded and reproduced onto and from the optical disc 1 in accordance with operations carried out by the user, and a terminal unit is provided for inputting and outputting various kinds of data.

Of course, it is possible to conceive a number of other typical configurations such as a recording-only apparatus and a reproduction-only apparatus.

By the way, the optical disc 1 is possibly shipped from the factory in a state prior to the initialization-formatting process. In this pre-formatting state, as shown in FIG. 4, the PB zone contains BCA and prerecorded data embedded in the wobbling groove whereas the RW zone contains recorded ADIP addresses embedded in the wobbling groove.

Before using such an optical disc 1, it is necessary to carry out the initialization-formatting process on the optical disc 1 to form a data structure in the lead-in zone like the one shown in FIG. 10. At that time, spare areas ISA and OSA in the data zone are determined by properly setting information in the defect management areas DMA.

In the initialization-formatting process, the disc drive apparatus forms a lead-in structure (that is, the data structure of defect management areas) explained earlier by referring to FIGS. 10 to 15 to result in an optical disc 1 having reliable defect management areas as described above.

It is to be noted that a disc drive apparatus can be used to carry out the initialization-formatting process before the optical disc 1 is shipped from the factory.

Figure 18:
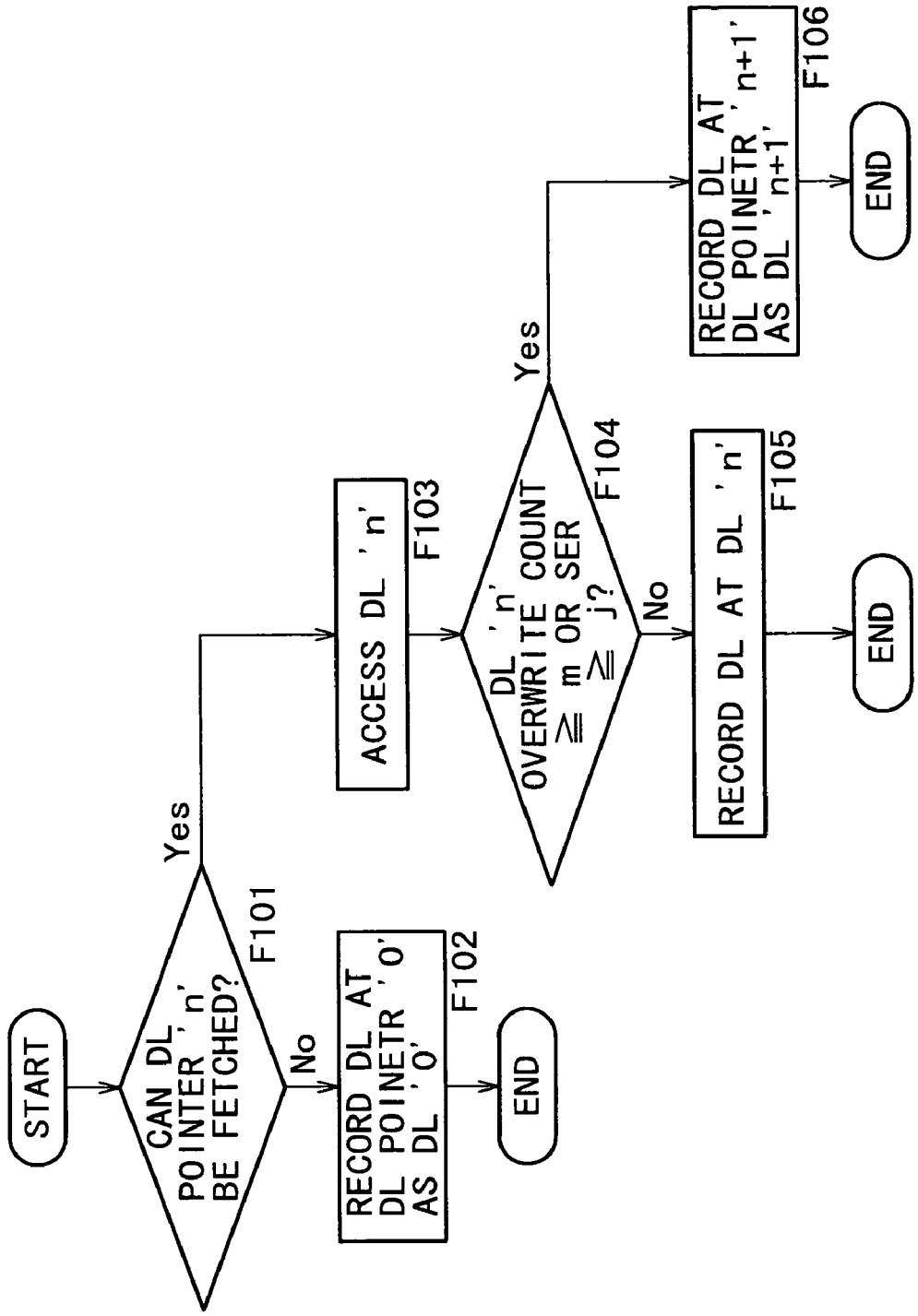
FIG. 18 shows a flowchart representing a process carried out by the disc drive apparatus implemented by the embodiment.

By referring to FIG. 18, the following description explains a process carried out by a disc drive apparatus to record/update disc management information (or the defect list DL).

FIG. 18 shows a flowchart representing the process carried out as control executed by the system controller 60.

The process to record/update the defect list DL begins with a step F101 to determine as to whether or not a DL pointer, which is a pointer pointing to the defect list, can be fetched. The DL pointer is the first PSN of the defect list DL. Recorded in the DDS shown in FIG. 13, the first PSN of the defect list DL is the start position of the defect list DL as described earlier. The determination is formed by actually reading out the DL pointer from the DDS.

It is to be noted that the DL pointer is identified by a pointer number having a value in the range 0 to 6 corresponding to respectively the first to seventh positions of the defect list DL, which have been explained before by referring to FIG. 12.

If the DL pointer cannot be read out from the DDS, indicating that a pointer value is not recorded in the DDS, the flow of the process goes on to a step F102 at which the defect list DL is recorded at the first position of the defect list DL. The first position of the defect list DL corresponds to DL pointer=0. In addition, the value of DL pointer=0 or the value of a pointer pointing to the start position of the defect list DL is recorded at a DDS entry allocated to the first PSN of the defect list DL.

The operations of the steps F101 and F102 are carried out by the system controller 60 employed in the disc drive apparatus to record the defect list DL at the first position allocated to the defect list DL when the disc drive apparatus carries out the initialization-formatting process or in a later process to record the defect list DL for the first time.

If the DL pointer pointing to a location at which a defect list DL has been recorded, can be read out from the DDS at the step F101 and the fetched DL pointer is numerical value "n", on the other hand, the flow of the process goes on to a step F103. DL pointer n, where n is the integer 1, 2, 3, 4, 5, 6, or 7, is a pointer pointing to respectively the first, second, third, fourth, fifth, sixth, or seventh position of the defect list DL.

At the step F103, the system controller 60 executes control to make an access to a recording area pointed to by the pointer (DL pointer) and read out the defect list DL recorded in this area.

Then, at the next step F104, the number of DL updates or the number of overwrite operations is read out from the header of the defect list DL and compared with a predetermined limit "m" of typically 1000 to determine as to whether or not the number of DL updates has exceeded the limit m. As an alternative, an SER (symbol error rate) detected in the operation to read out the defect list DL is compared with a predetermined limit j to determine as to whether or not the SER has exceeded the limit j.

If the outcome of the determination indicates that the number of DL updates has not exceeded the limit m or the SER has not exceeded the limit j, the flow of the process goes on to a step F105 at which an updated DL is stored in a recording area pointed to by the current pointer (DL pointer n).

If the outcome of the determination formed at the step F104 indicates that the number of DL updates has exceeded the limit m or the SER has exceeded the limit j, on the other hand, the recording area pointed to by the current DL pointer is determined to have been used exhaustively. In this case, the flow of the process goes on to a step F106 at which the recording area pointed to by the current pointer (DL pointer n) is replaced by the next spare recording area pointed to by next pointer (DL pointer)=(n+1) and an updated DL is stored in the next spare recording area.

In addition, the value of a pointer pointing to the first position of the defect list DL is updated from the value of pointer (DL pointer)=n to the value of pointer (DL pointer) =(n+1) and recorded at a DDS entry allocated to the first PSN of the defect list DL. As described above, DL pointer= (n+1) points to next spare recording area.

Thus, in the process carried out by the disc drive apparatus to record and update the defect list DL as described above, one of the first to seven positions of the defect list DL is used or, if necessary, replaced by a next spare recording area, which is also selected among the rest of the first to seven positions.

Accordingly, the defect list DL can be updated reliably a number of times exceeding the maximum number of overwrite operations. As a result, it is possible to improve the reliability of operations to record and reproduce data onto and from the optical disc 1.

The above descriptions explain the disc implemented by an embodiment and the disc drive apparatus provided by another embodiment for the disc. However, the scope of the present invention is not limited to these embodiments. It is possible to conceive a variety of changes to be made to the embodiments as long as the changes are within the range of essentials of the present invention.

For example, the disc can be a multi-layer disc having a plurality of recording layers such as two or three layers. In the case of such a multi-layer disc, it is possible to provide a plurality of management-data areas, which are laid out on regions separately from each other in the radial direction in the lead in zone formed on each of the recording layers. The management-data areas include the defect management areas DMA. Each of the defect management areas DMA includes an area for recording a defect list DL and spare areas each usable as a substitute for the area for recording the defect list DL.

In addition, it is also possible to form a plurality of management-data areas each including a defect management area DMA on the outer circumference side of the disc. In this case, the management-data areas are also laid out on regions separately from each other in the radial direction. Also in this case, it is nice to provide the defect management areas DMA, which each include an area for recording a defect list DL and spare areas each usable as a substitute for the area for recording the defect list DL.

INDUSTRIAL APPLICABILITY

As is obvious from the above descriptions, the present invention exhibits the following effects.

By providing a plurality of management data areas each including a defect management area typically in a lead-in zone of a disc inner-side region enclosed by a circumference having a predetermined radius on a disc-shaped recording medium, reliability of the defect management can be obtained. In addition, by placing a plurality of the defect management areas (information areas Info1 and Info2) at locations, which are separated from each other in the radial direction of the disc-shaped recording medium, sandwiching a recording/reproduction condition adjustment area OPC having a relatively large size, the reliability of the defect management areas can be further improved. This is because, even if a defect, an injury or the like exists in one of the defect management areas, the defect, the injury or the like does not have any effect on the other defect management areas. As a result, it is possible to form reliable defect management areas and to execute defect management by using the defect management areas.

Furthermore, by providing each of the defect management areas with a plurality of recording areas, which include a currently used recording area for recording defect management information and spare recording areas each usable as a substitute for the currently used recording area, the currently used recording area can be replaced with one of the spare recording areas in accordance with an update count of the currently used recording area or error status of this currently used recording area.

The updating count is thus the number of times data has been written over defect management information stored in the currently used recording area. Typically, the updating count is recorded on the disc and can thus be read out from the disc to be compared with a predetermined limit. If the updating count is greater than the predetermined limit, an updated defect list is thereafter recorded in one of the spare areas, which is selected to serve as a substitute for the currently used recording area.

Accordingly, even in the case of an optical disc imposing a limit on an overwrite-operation count, which is the number of times data has been written over already stored defect management information, data can be written over already stored information a number of times exceeding the limit. As a result, information can be recorded and reproduced into and from a defect management area with a high degree of reliability. An example of the optical disc imposing a limit on an overwrite-operation count is an optical disc, onto which data is recorded by adoption of the phase-change recording method as described above.

In accordance with the present invention, by using one of the spare defect management areas as a substitute for the currently used defect management area, which has become defective due to an injury, a defect or the like existing in the currently used defect management area, it is possible to eliminate effects of the injury, the defect or the like. Since such effects can be eliminated and already stored information can be overwritten a number of times exceeding the limit on the overwrite-operation count, information can be recorded and reproduced into and from a defect management area with an extremely high degree of reliability.

The invention claimed is:

1. A disc-shaped recording medium comprising a recording/reproduction condition adjustment area including test data and a plurality of management data areas each including a defect management area, which are formed in a disc inner-side region enclosed by a circumference having a predetermined radius on said disc-shaped recording medium, wherein said management data areas are placed at locations, which are separated from each other in the radial direction of said disc-shaped recording medium, sandwiching at least said recording/reproduction condition adjustment area.

2. The disc-shaped recording medium according to claim 1 wherein said defect management area has a plurality of recording areas, which include a currently used recording area for recording defect management information and spare recording areas each usable as a substitute for said currently used recording area.

3. A disc recording method for forming a recording/reproduction condition adjustment area including test data and a plurality of management data areas each including a defect management area in a disc inner-side region enclosed by a circumference having a predetermined radius on a disc-shaped recording medium by placing said management data areas at locations, which are separated from each other in the radial direction of said disc-shaped recording medium, sandwiching at least said recording/reproduction condition adjustment area.

4. The disc recording method according to claim 3 wherein said defect management area has a plurality of recording areas, which include a currently used recording area for recording defect management information and spare recording areas each usable as a substitute for said currently used recording area.

5. A disc recording method for recording information onto a disc-shaped recording medium comprising a recording/reproduction condition adjustment area including test data and a plurality of management data areas each including a defect management area, which are formed in a disc inner-side region enclosed by a circumference having a predetermined radius on said disc-shaped recording medium, wherein:

said management data areas are placed at locations, which are separated from each other in the radial direction of said disc-shaped recording medium, sandwiching at least said recording/reproduction condition adjustment area; and said defect management area is formed as a region having a plurality of recording areas, which include a currently used recording area for recording defect management information and spare recording areas each usable as a substitute for said currently used recording area, said disc recording method comprising the steps of:

determining an update count of said currently used recording area or error status of said currently used recording area in an operation to record said defect management information onto said disc-shaped recording medium to give a determination result to serve as a basis for determining whether or not said defect management information should be recorded in any specific one of said spare recording areas; and setting said specific spare recording area as said substitute for said currently used recording area in case said defect management information is recorded in said specific spare recording area.

6. A disc drive apparatus for recording information onto a disc-shaped recording medium comprising a recording/reproduction condition adjustment area including test data and a plurality of management data areas each including a defect management area, which are formed in a disc inner-side region enclosed by a circumference having a predetermined radius on said disc-shaped recording medium, wherein:

said management data areas are placed at locations, which are separated from each other in the radial direction of said disc-shaped recording medium, sandwiching at least said recording/reproduction condition adjustment area; and said defect management area has a plurality of recording areas, which include a currently used recording area for recording defect management information and spare recording areas each usable as a substitute for said currently used recording area, said disc drive apparatus comprising recording means for recording and reproducing said information onto and from said disc-shaped recording medium and control means for:

determining an update count of said currently used recording area or error status of said currently used recording area in an operation to record said defect management information onto said disc-shaped recording medium to give a determination to serve as a basis for determining whether or not said defect management information should be recorded in any specific one of said spare recording areas; and recording management data for setting said specific spare recording area as said substitute for said currently used recording area in case said defect management information is recorded in said specific spare recording area.

* * * * *